(12) United States Patent
Tamai et al.

(10) Patent No.: US 11,095,783 B2
(45) Date of Patent: Aug. 17, 2021

(54) GESTURE-BASED MENU SCROLL OPERATION ON A DISPLAY APPARATUS

(71) Applicant: Konica Minolta, Inc., Chiyoda-ku (JP)

(72) Inventors: Yoshiyuki Tamai, Toyohashi (JP); Yoichi Kurumasa, Toyokawa (JP); Mitsutaka Morita, Hachioji (JP); Ryosuke Nishimura, Toyokawa (JP); Mie Kawabata, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/060,992

(22) Filed: Oct. 23, 2013

(65) Prior Publication Data

US 2014/0118782 A1    May 1, 2014

(30) Foreign Application Priority Data

Oct. 29, 2012  (JP) .............................. JP2012-237912

(51) Int. Cl.
*H04N 1/00* (2006.01)
*G06F 3/0488* (2013.01)
(Continued)

(52) U.S. Cl.
CPC ....... *H04N 1/00424* (2013.01); *G06F 3/0482* (2013.01); *G06F 3/0485* (2013.01);
(Continued)

(58) Field of Classification Search
CPC ........... H04N 1/00424; H04N 1/00413; H04N 1/00482; H04N 1/00474;
(Continued)

(56) References Cited

U.S. PATENT DOCUMENTS 6,020,887 A * 2/2000 Loring ................ G06F 3/04855
715/786
2008/0040692 A1* 2/2008 Sunday et al. ................ 715/863
(Continued)

FOREIGN PATENT DOCUMENTS

CN       102123221 A     7/2011
JP       2011-138436 A   7/2011
(Continued)

OTHER PUBLICATIONS

Phones4u, HTC One Series Tips 'N' Tricks: Change Your App Dock Icons—Phones 4 U, Apr. 26, 2012, https://www.youtube.com/watch?v=qDiL7H_TEJE, pp. 1-5.*
(Continued)

*Primary Examiner* — Daniel W Parcher
(74) *Attorney, Agent, or Firm* — Buchanan Ingersoll & Rooney PC

(57) ABSTRACT

An image forming apparatus displays part of function keys for menu items of basic functions so as to be stopped at a predetermined stop position. The image forming apparatus switches the function keys for menu items of basic functions to be displayed, by displaying another part of function keys for menu items of basic functions so as to be stopped at a predetermined stop position. When part of function keys for menu items of advanced functions are displayed so as to be arranged in a predetermined direction, the image forming apparatus accepts scroll operation and then moves the menu items of advanced functions by a distance decided based on the speed of the scroll operation.

62 Claims, 15 Drawing Sheets

(51) Int. Cl.
  *G06F 3/0482* (2013.01)
  *G06F 3/0485* (2013.01)

(52) U.S. Cl.
  CPC ...... *G06F 3/04883* (2013.01); *G06F 3/04886* (2013.01); *H04N 1/00413* (2013.01); *H04N 1/00474* (2013.01); *H04N 1/00482* (2013.01); *H04N 2201/0094* (2013.01)

(58) Field of Classification Search
  CPC ........ H04N 2201/0094; G06F 3/04886; G06F 3/0482; G06F 3/0485; G06F 3/04883
  See application file for complete search history.

(56) References Cited

U.S. PATENT DOCUMENTS

| | | | |
|---|---|---|---|
| 2008/0148192 A1* | 6/2008 | Read | G06F 17/30905 715/854 |
| 2010/0251116 A1* | 9/2010 | Rimas-Ribikauskas | G06F 3/017 715/702 |
| 2011/0084925 A1* | 4/2011 | Baik et al. | 345/173 |
| 2011/0161867 A1* | 6/2011 | Tomita et al. | 715/785 |
| 2011/0317192 A1* | 12/2011 | Fukuoka et al. | 358/1.13 |
| 2012/0017176 A1* | 1/2012 | Choi et al. | 715/825 |
| 2012/0026522 A1 | 2/2012 | Igawa | |
| 2012/0062688 A1* | 3/2012 | Shen etal. | 348/14.03 |
| 2012/0072839 A1* | 3/2012 | Ogino | G06F 3/0488 715/274 |
| 2012/0324383 A1* | 12/2012 | Tremblay | G06F 3/0482 715/765 |
| 2013/0159936 A1 | 6/2013 | Yamaguchi et al. | |

FOREIGN PATENT DOCUMENTS

| | | |
|---|---|---|
| JP | 2011-248685 A | 12/2011 |
| JP | 2011-253224 | 12/2011 |
| JP | 2011-259393 | 12/2011 |
| JP | 2012-027856 A | 2/2012 |
| JP | 2012-053824 | 3/2012 |
| JP | 2012-069010 | 4/2012 |
| JP | 2012198750 A | 10/2012 |
| WO | 2012039441 A1 | 3/2012 |

OTHER PUBLICATIONS

Phones4u, HTC One Series Tips 'N' Tricks: Change Your App Dock Icons—Phones4u, Apr. 26, 2012, https://www.youtube.com/watch?v=qDiL7H_TEJE, pp. 1-7. (Year: 2012).*

Nova, Nova Launcher—Best App Drawer / Folder management [for Android ICS/JB], Jun. 27, 2012, https://www.youtube.com/watch?v=jGpkdTnzXG8, pp. 1-6. (Year: 2012).*

Notification of Reasons for Refusal issued in corresponding Japanese Patent Application No. 2012-237912, dated Dec. 24, 2014, with English translation.

First Office Action dated Mar. 23, 2016, by the State Intellectual Property Office of the People's Republic of China in corresponding Chinese Patent Application No. 201310520282.3, and an English Translation of the Office Action (27 pages).

Chinese Office Action ("Third Office Action") dated May 19, 2017, by the State Intellectual Property Office of the People's Republic of China in corresponding Chinese Patent Application No. 201310520282.3 and English translation of the Office Action (50 pages).

Second Office Action dated Dec. 13, 2016 by the State Intellectual Property Office of the People'Republic of China in corresponding Chinese Patent Application No. 201310520282.3, and English translation of Office Action (36 pages).

Chinese Office Action ("Decision of Rejection") dated Oct. 25, 2017, by the State Intellectual Property Office of the People's Republic of China in corresponding Chinese Patent Application No. 201310520282.3 and English translation of the Office Action (31 pages).

Office Action dated Aug. 26, 2019, by the Chinese Patent Office in corresponding Chinese Patent Application No. 201811337615.8, and an English Translation of the Office Action. (20 pages).

* cited by examiner

GESTURE-BASED MENU SCROLL OPERATION ON A DISPLAY APPARATUS

This application is based on Japanese Patent Application No. 2012-237912 filed with the Japan Patent Office on Oct. 29, 2012, the entire content of which is hereby incorporated by reference.

BACKGROUND OF THE INVENTION

Field of the Invention

The present invention relates to a display apparatus accepting scroll operation, and more particularly to a display apparatus with improved operability.

Description of the Background Art

Today, image forming apparatuses, including MFPs (Multi-Functional Peripherals) as a typical example, are installed with touch panel-type operation panels. Users can make input operation to an image forming apparatus by touching a software key displayed on the operation panel.

In conventional operation panels of MFPs, display screens are sorted by hierarchy. In general, a screen including function keys (also called function badges or setting keys) for accepting settings of basic functions is displayed as a screen in a higher level. When an "advanced function key" is pressed in this higher-level screen, the screen changes to a screen in a level below that includes function keys for accepting settings of advanced functions.

Document 1 below discloses an image forming apparatus, in which a basic mode screen shifts to an application mode screen when an application button is pressed. This image forming apparatus displays the application mode screen, which includes a function button display area in which a plurality of function buttons for displaying setting screens for the functions installed in the image processing apparatus are displayed, and an icon display area in which icons corresponding to the function buttons are displayed according to groups classified by attributes of the functions. When the user designates a desired section in the icon display area, the image forming apparatus slides the function button corresponding to the icon present in the designated section to the function button display area of the display screen for display. [Document 1] Japanese Laid-Open Patent Publication No. 2011-138436

In conventional image limning apparatuses, if there are so many function keys for basic functions that all the function keys for basic functions cannot be displayed at a time on a screen of the operation panel, the image forming apparatus displays part of the function keys for basic functions and a toggle button on a screen of the operation panel. When the toggle button is pressed, the function keys displayed are switched to the remaining part of the function keys for basic functions. On the other hand, if there are so many function keys for advanced functions that all the function keys for advanced functions cannot be displayed at a time on a screen of the operation panel, the image forming apparatus displays part of the function keys for advanced functions on a screen of the operation panel. When scroll operation such as flick operation or swipe operation (drag operation) is accepted, the function keys for advanced functions are scrolled, whereby the function keys displayed are switched to another part of the function keys for advanced functions.

In conventional image forming apparatuses, however, the operability is poor in that the operation of switching functions is different between when the function keys for basic functions are displayed and when the function keys for advanced functions are displayed.

In this respect, when scroll operation on the function keys for basic functions is accepted, the function keys for basic functions may be scrolled in the same manner as the function keys for advanced functions. With this approach, however, the operability is deteriorated because the display positions of the function keys for basic functions are changed by scrolling. More specifically, since the function keys for basic functions are frequently used, the users may remember the positions of those keys and thereby acquire quick operation on the function keys. Therefore, if the display positions of the function keys for basic functions are changed by scrolling, the user cannot recognize the functions only by their positions and has to read the characters displayed on the function keys before performing operation. On the other hand, in general, the function keys for advanced functions are used less frequently than the function keys for basic functions. The function keys for advanced functions should therefore be scrollable as in a conventional manner to make it easy to recognize the function names and improve operability.

SUMMARY OF THE INVENTION

The present invention is made to solve the problem above. An object of the present invention is to provide a display apparatus with improved operability.

A display apparatus according to an aspect of the present invention includes: a first display unit for displaying a first part of function keys for first menu items so as to be stopped at a predetermined stop position, the first menu items being configured with a plurality of function keys for accepting settings of functions of the display apparatus; a first operation accepting unit for accepting scroll operation on the first display unit; a first switch unit for, if the scroll operation is accepted by the first operation accepting unit, switching the function keys for the first menu items to be displayed, by displaying a second part of function keys for the first menu items so as to be stopped at a predetermined stop position, the second part being different from the first part; a second display unit for displaying at least part of function keys for second menu items so as to be arranged in a predetermined direction, the second menu items being different from the first menu items and being configured with a plurality of function keys for accepting settings of functions of the display apparatus; a second operation accepting unit for accepting scroll operation on the second display unit; and a scroll unit for, if scroll operation is accepted by the second operation accepting unit, moving the second menu items by a distance decided based on a speed of the scroll operation accepted by the second operation accepting unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below in conjunction with the figures.

In the present embodiment, the display apparatus is an image forming apparatus. The image forming apparatus includes an MFP, a facsimile machine, a copier, and a printer. The display apparatus may be any device other than the image forming apparatus, for example, such as a tablet, a smart phone, or a PC (Personal Computer).

In this specification, "scroll operation" means operation of moving an operating member such as a finger or stylus in any given direction on a touch panel, starting from a point on the touch panel. The scroll operation includes flick operation, swipe operation, and operation of moving a scroll bar.

[Configuration of Image Forming Apparatus]

Figure 1:
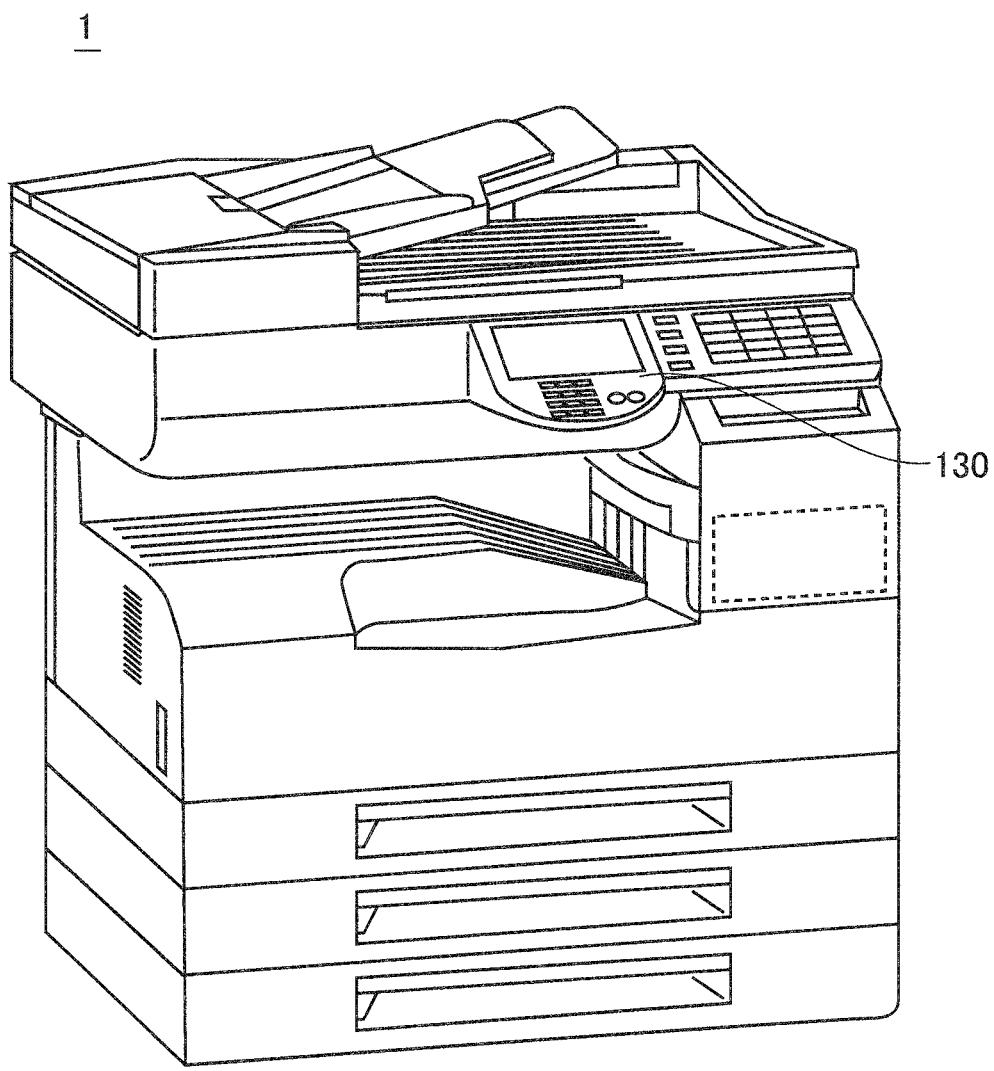
FIG. 1 is an external view schematically showing an image forming apparatus in an embodiment of the present invention.

Referring to FIG. 1, an image forming apparatus 1 is here an MFP and includes an operation panel 130 on the front surface thereof. Operation panel 130 displays a variety of information related to image forming apparatus 1 and accepts operation for image forming apparatus 1.

Figure 2:
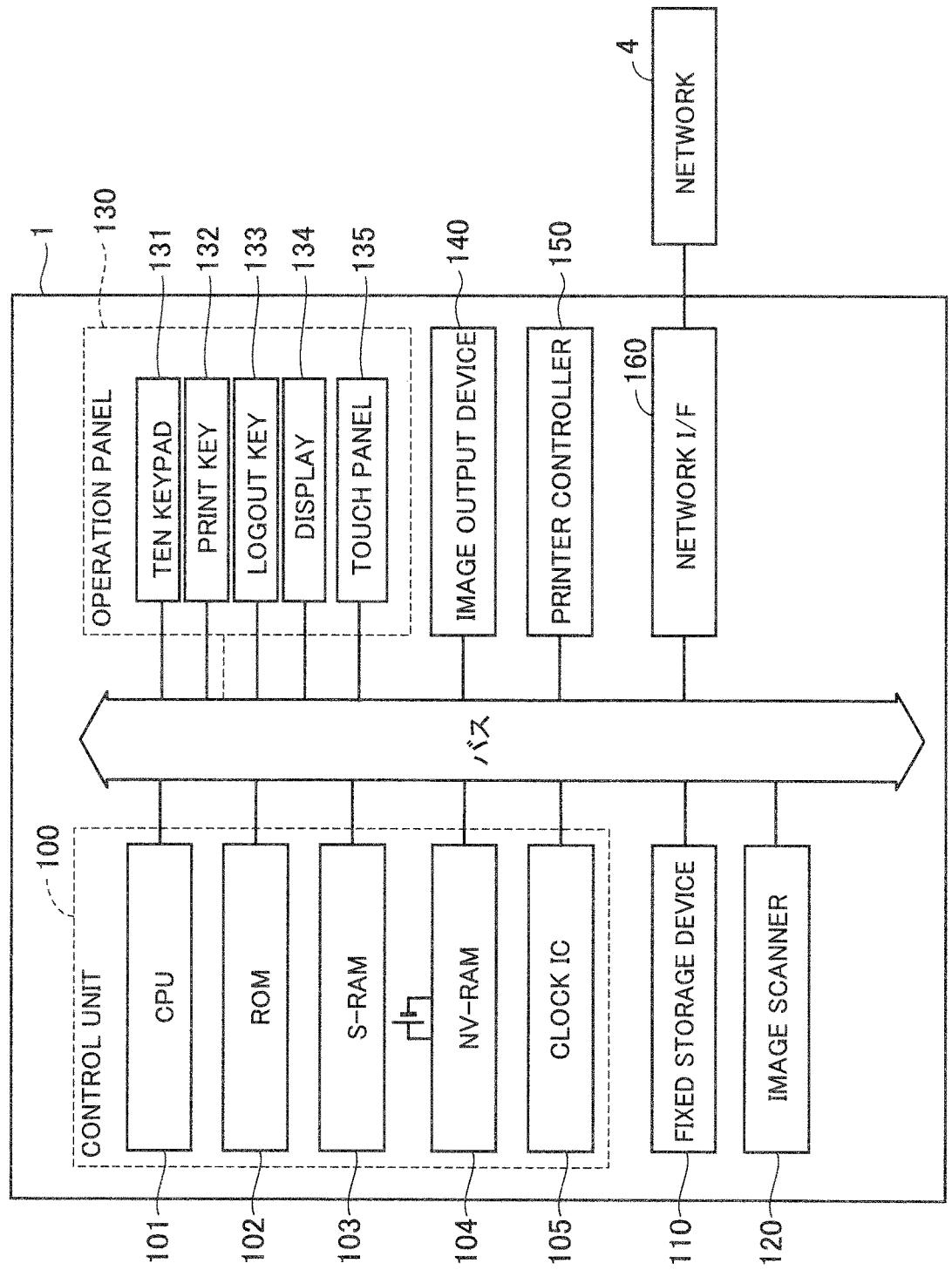
FIG. 2 is a block diagram showing an internal configuration of image forming apparatus 1.

FIG. 2 is a block diagram showing an internal configuration of image forming apparatus 1.

Referring to FIG. 2, image forming apparatus 1 includes a CPU 101, a ROM (Read Only Memory) 102, an SRAM (Static Random Access Memory) 103, an NVRAM (Non Volatile Random Access Memory) 104, a clock IC (Integrated Circuit) 105, a fixed storage device 110, an image scanner 120, an operation panel 130, an image output device 140, a printer controller 150, and a network I/F 160.

ROM 102, SRAM 103, NVRAM 104, and clock IC 105 are each connected to CPU 101 through a bus. CPU 101, ROM 102, SRAM 103, NVRAM 104, and clock IC 105 constitute a control unit 100. ROM 102 stores a control program for controlling the operation of image forming apparatus 1. SRAM 103 is a working memory for CPU 101. NVRAM 104 is battery backed up to store a variety of settings related to image formation.

Fixed storage device 110, image scanner 120, operation panel 130, image output device 140, printer controller 150, and network I/F 160 are each connected to control unit 100 through a bus. Fixed storage device 110 is, for example, an HDD (Hard Disk Device) and stores a variety of information such as screen data of screens displayed on operation panel 130 and boxes for storing various files. Fixed storage device 110 additionally stores function keys that configure menu items of basic functions, and display positions thereof, and function keys that configure menu items of advanced functions. Image scanner 120 scans a document image. Operation panel 130 mainly includes a ten keypad 131 for inputting numerals, a print key 132 accepting an instruction to execute a print job, a logout key 133 accepting logout, a display 134 such as an LCD for displaying screens for a variety of information, and a touch panel 135 arranged on the front surface of display 134. Touch panel 135 accepts touch operation (including flick operation or swipe operation) on display 134. Image output device 140 forms an image on paper. Printer controller 150 generates a copy image from print data received from network I/F 160. Network I/F 160 connects image forming apparatus 1 to a network 4 through a network cable. Network I/F 160 transmits/receives a variety of information to/from an external device connected to network 4.

[Operation Screen Switching Method]

A method of switching operation screens displayed on operation panel 130 will now be described.

Figure 3:
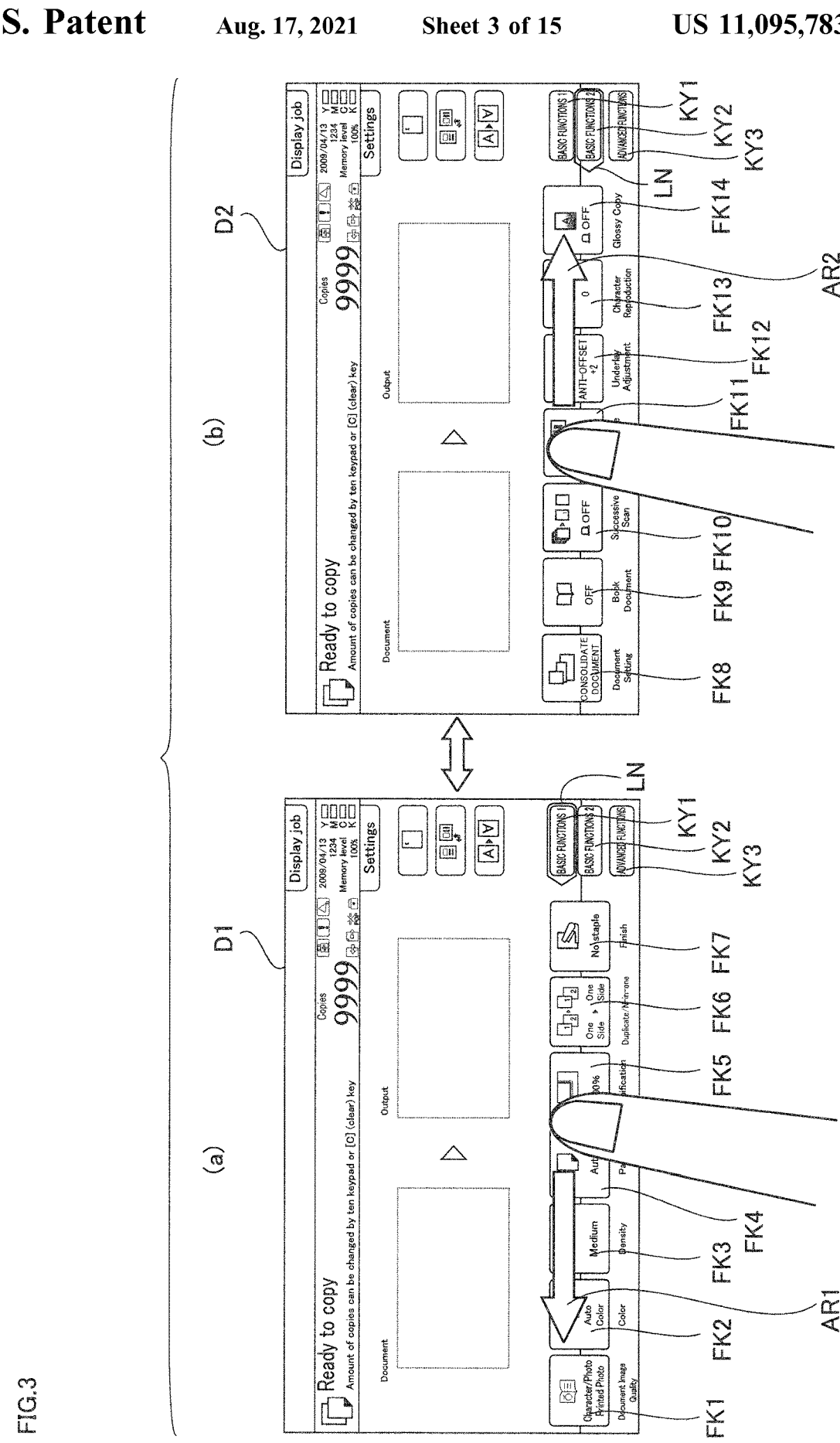
FIG. 3 is a diagram schematically showing an operation screen for basic functions displayed on display 134 of operation panel 130.

FIG. 3 is a diagram schematically showing an operation screen for basic functions displayed on display 134 of operation panel 130.

Referring to FIG. 3, when power is turned on or when a reset key (not shown) is pressed, image forming apparatus 1 displays an operation screen D1 for basic functions as an initial screen, as shown in (a).

Operation screen D1 includes function keys FK1 to FK7 and screen switch keys KY1 to KY3. Function keys FK1 to FK7 are arranged in the horizontal direction at the bottom of operation screen D1. Function keys FK1 to FK7 are part of function keys (hereinafter also referred to as function keys for basic functions) that configure menu items of basic functions, and are classified into "basic functions 1". Since the number of function keys for basic functions is so many that all the function keys for basic functions cannot be displayed in operation screen D1, the function keys for basic functions are classified into "basic functions 1" and "basic functions 2". Image forming apparatus 1 accepts the settings of functions of image forming apparatus 1 (here, the settings of basic functions related to a copy job of image forming apparatus 1) through function keys FK1 to FK7.

Screen switch keys KY1 to KY3 are arranged in the vertical direction at the lower right of operation screen D1. Screen switch key KY1 is a key for switching the function keys displayed on display 134 to the function keys classified in "basic functions 1" (a key for displaying operation screen D1 on display 134). Screen switch key KY2 is a key for switching the functions displayed on display 134 to function keys classified in "basic functions 2" (a key for displaying operation screen D2 on display 134). Screen switch key KY3 is a key for changing menu items to be set, from the menu items of basic functions to the menu items of advanced functions. In operation screen D1, since function keys FK1 to FK7 classified in "basic functions 1" are displayed, image forming apparatus 1 does not accept operation on screen switch key KY1. Screen switch key KY1 is surrounded by an outline LN. This makes the user understand that the function keys for basic functions are switched on a group-by-group basis, namely, between "basic functions 1" and "basic functions 2".

When operation screen D1 is displayed on display 134, image forming apparatus 1 accepts, from the user, scroll operation of sliding the operating member on the display right to left as shown by arrow AR1, in a function key display region (a region in which function keys FK1 to FK7 are displayed). This scroll operation is the operation of scrolling the menu items of basic functions to the right.

When accepting this scroll operation, image forming apparatus 1 displays operation screen D2, which is another operation screen for basic functions, on display 134 as shown in (b), irrespective of the speed of the accepted scroll operation (the moving speed of the operating member in the scroll operation). This makes switching of the function keys for menu items of basic functions displayed on display 134. Image forming apparatus 1 also displays operation screen D2 when a press on screen switch key KY2 is accepted in a state in which operation screen D1 is displayed on display 134.

Operation screen D2 includes function keys FK8 to FK14 and screen switch keys KY1 to KY3. Function keys FK8 to FK14 are arranged in the horizontal direction at the bottom of operation screen D2. Function keys FK8 to FK14 are another part of the function keys for basic functions (the rest of all the function keys for basic functions, excluding function keys FK1 to FK7), and are classified into "basic functions 2". Image forming apparatus 1 accepts the settings of the functions of image forming apparatus 1 (here, the settings of basic functions related to a copy job of image forming apparatus 1) through function keys FK8 to FK14.

Screen switch keys KY1 to KY3 are arranged in the vertical direction at the lower right of operation screen D2. In operation screen D2, since function keys FK8 to FK14 classified in "basic functions 2" are displayed, image forming apparatus 1 does not accept operation on screen switch KY2. Screen switch key KY2 is surrounded by an outline LN.

When operation screen D2 is displayed on display 134, image forming apparatus 1 accepts, from the user, scroll operation of sliding the operating member on the display left to right as shown by arrow AR2, in a function key display region (a region where function keys FK8 to FK14 are displayed). This scroll operation is the operation of scrolling the menu items of basic functions to the left.

When accepting this scroll operation, image forming apparatus 1 displays operation screen D1 on display 134, as shown in (a), irrespective of the speed of the accepted scroll operation. This makes switching of the function keys for the menu items of basic functions displayed on display 134. Image forming apparatus 1 also displays operation screen D1 when a press on screen switch key KY1 is accepted in a state in which operation screen D2 is displayed on display 134.

When settings of the function keys for basic functions are accepted, image forming apparatus 1 always displays the function keys for basic functions at a predetermined stop position in the operation screen. Specifically, when the settings of function keys FK1 to FK7 are accepted, image forming apparatus 1 always displays function keys FK1 to FK7 at a predetermined stop position in operation screen D1.

When the settings of function keys FK8 to FK14 are accepted, image forming apparatus 1 always displays function keys FK8 to FK14 at a predetermined stop position in operation screen D2. The function keys for accepting settings are always displayed at the same position, so that the user can quickly operate a function key by remembering the display position of the function key frequently used among function keys FK1 to FK14.

In order to switch the operation screen displayed on display 134 from operation screen D1 to operation screen D2, image forming apparatus 1 may switch the menu items of basic functions displayed, in such a manner as to scroll the function keys for basic functions to the right on a screen-by-screen basis. This will be described with reference to FIG. 14.

Figure 4:
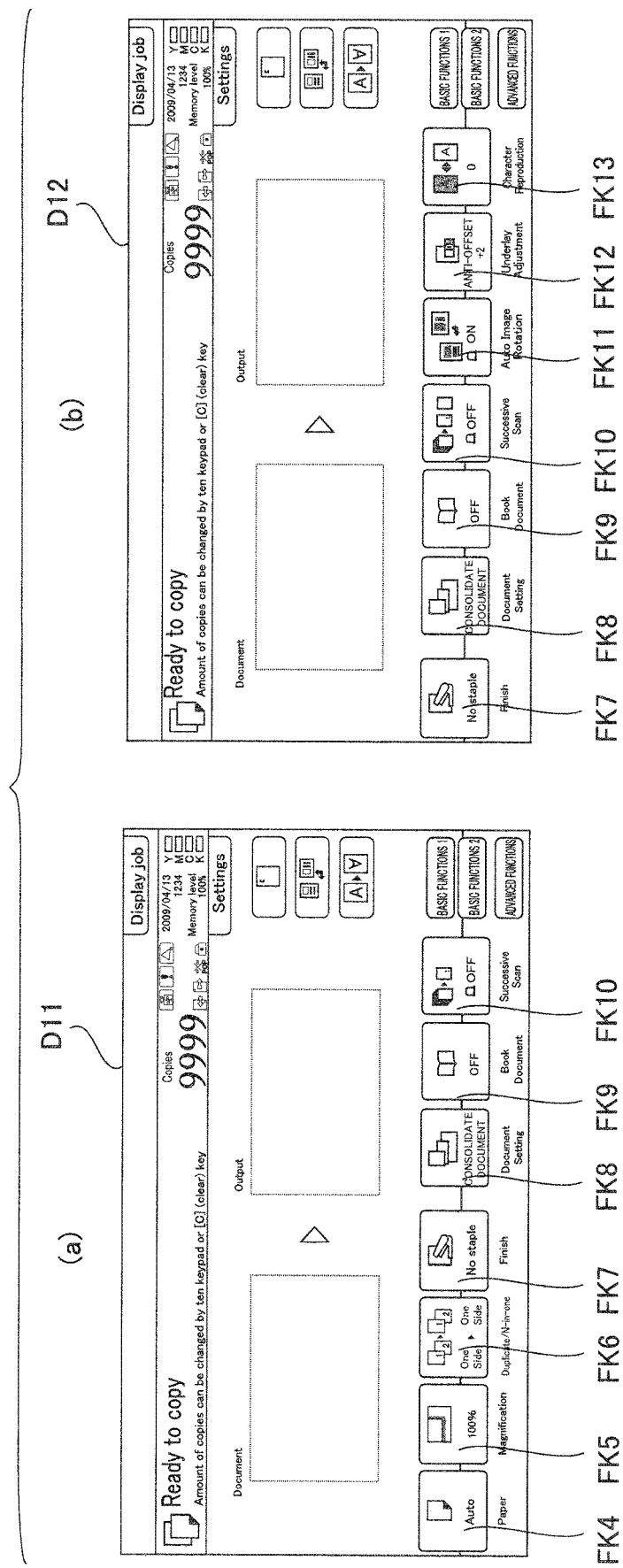
FIG. 4 is a diagram schematically showing an operation screen during scrolling that is displayed when the operation screen displayed on display 134 is changed from operation screen D1 to operation screen D2.

FIG. 4 is a diagram schematically showing an operation screen during scrolling that is displayed when the operation screen displayed on display 134 is changed from operation screen D1 to operation screen D2.

Referring to FIG. 4, as shown in (a), for example, image forming apparatus 1 displays an operation screen D11 in which the function keys for basic functions are scrolled to the right by the amount of three function keys from the state of operation screen D1. In operation screen D11, function keys FK1 to FK3 disappear from the screen, and function keys FK4 to FK7 are displayed each at a position shifted to the left by the amount of three function keys. Function keys FK8 to FK10 newly appear at the positions to the right of function key 7 where function keys FK5 to FK7 were displayed in operation screen D1.

Subsequently, as shown in (b), image forming apparatus 1 displays an operation screen D12 in which the function keys for basic functions are scrolled to the right by the amount of six function keys from the state of operation screen D1. In operation screen D12, function keys FK1 to FK6 disappear from the screen, and function key FK7 is displayed at the position shifted to the left by the amount of six function keys. Function keys FK8 to FK13 newly appear at the positions to the right of function key FK7 where function keys FK2 to FK7 were displayed in operation screen D1. As operation screens during scrolling, more operation screens may be displayed in such a manner that the function keys are moved step by step.

Image forming apparatus 1 displays operation screen D2 after displaying operation screen D12. Thus, the scrolling of the operation screen for basic functions on a screen-by-screen basis is completed. Operation screens D11 and D12 are operation screens during scrolling of the function keys for basic functions, and image forming apparatus 1 does not accept operation on the function keys while displaying operation screen D11 or D12 (during scrolling). In other words, image forming apparatus 1 accepts operation on the function keys for basic functions only when the function keys for basic functions are displayed so as to be stopped at a predetermined position (when operation screen D1 or operation screen D2 is displayed).

Conversely, in order to switch the operation screen displayed on display 134 from operation screen D2 to operation screen D1, image forming apparatus 1 may switch the menu items of basic functions displayed in such a manner as to scroll the function keys for basic functions to the left on a screen-by-screen basis (by displaying operation screen D12 and operation screen D11 in this order).

Figure 5:
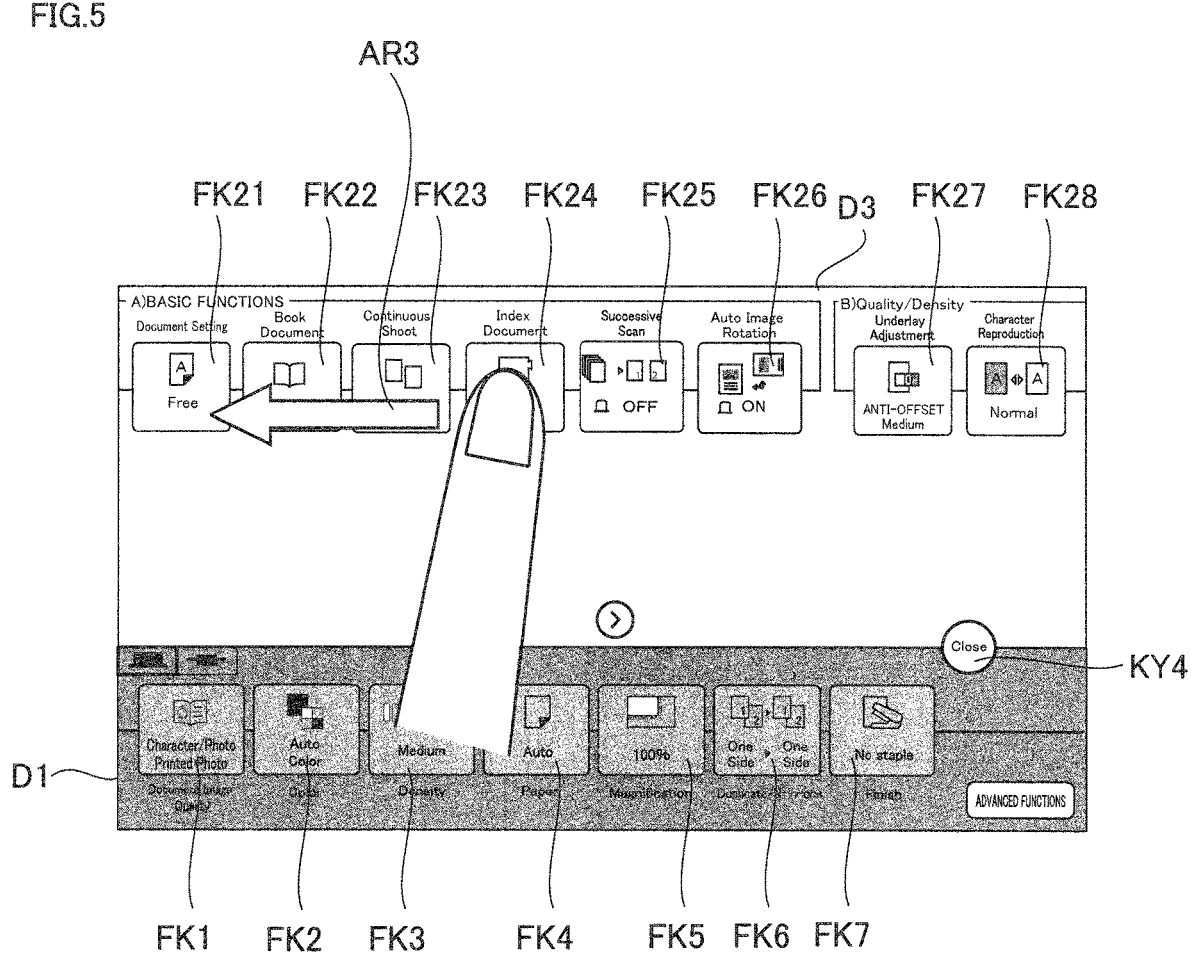
FIG. 5 is a diagram schematically showing an operation screen for advanced functions displayed on display 134 of operation panel 130.

FIG. 5 is a diagram schematically showing an operation screen for advanced functions displayed on display 134 of operation panel 130.

Referring to FIG. 5, when a press on screen switch key KY3 is accepted in operation screen D1 shown in FIG. 3(a), image forming apparatus 1 pops up an operation screen D3 for advanced functions onto operation screen D1. Operation screens D1 and D2 are screens in a higher level (first layer), whereas operation screen D3 is a screen in a lower level (second layer). In this case, image forming apparatus 1 grays out operation screen D1 and does not accept operation on function keys FK1 to FK7 included in operation screen D1.

Operation screen D3 includes function keys FK21 to FK28 and a screen switch key KY4 ("CLOSE" key). Function keys FK21 to FK28 are arranged in the horizontal direction at the top of operation screen D3. Function keys FK21 to FK28 are part of function keys that configure the menu items of advanced functions (hereinafter also referred to as function keys for advanced functions). In operation screen D3, the number of function keys for advanced functions is so many that all of the function keys for advanced functions cannot be displayed. The menu items of advanced functions are therefore displayed in a scrollable manner in a function key display region (a region where function keys FK21 to FK28 are displayed). Image forming apparatus 1 accepts the settings of the functions of image forming apparatus 1 (here, the settings of advanced functions related to a copy job of image forming apparatus 1) through function keys FK21 to FK28.

Screen switch key KY4 is arranged at the lower right of operation screen D3. Screen switch key KY4 is a key for cancelling popup display of operation screen D3. When a press on screen switch key KY4 is accepted, image forming apparatus 1 displays the operation screen (here, operation screen D1) displayed before operation screen D3 is popped up, and accepts a press on a function key included in the operation screen.

When a press on screen switch key KY3 is accepted in operation screen D2 shown in FIG. 3(b), image forming apparatus 1 pops up operation screen D3 onto operation screen D2. Image forming apparatus 1 performs the same operation as when screen switch key KY3 is pressed in operation screen D1, except that the operation screen underlying operation screen D3 is not operation screen D1 but operation screen D2.

When operation screen D3 is displayed on display 134, image forming apparatus 1 cancels acceptance of scroll operation on function keys FK1 to FK7 in operation screen D1 and starts acceptance of scroll operation on function keys FK21 to FK28 in operation screen D3. Function keys FK21 to FK28 displayed in FIG. 5 are seven function keys at the left end of the function keys for advanced functions arranged in the horizontal direction. In this state, the function key display region can be scrolled to the right.

Image forming apparatus 1 accepts, from the user, scroll operation as shown by arrow AR3 in the function key display region of operation screen D3. This scroll operation is the operation of scrolling the menu items of advanced functions to the right.

When accepting this scroll operation, image forming apparatus 1 scrolls the menu items of advanced functions by a distance decided based on the speed of the accepted scroll operation (smooth scroll). Since the advanced functions are less frequently used, the user can easily recognize the names of the advanced functions by scrolling the menu items of advanced functions in accordance with the scroll operation.

Figure 6:
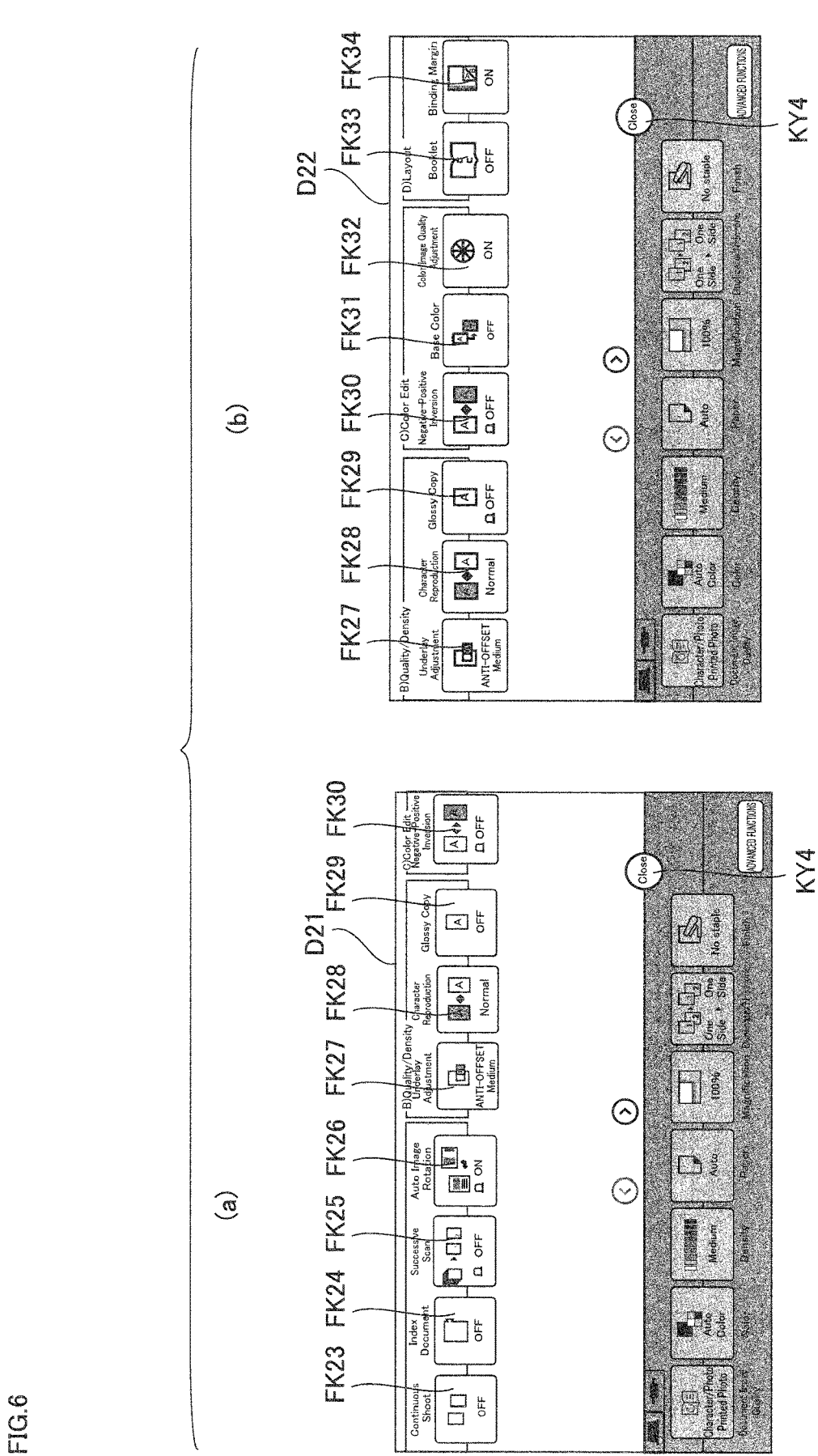
FIG. 6 is a diagram schematically showing an operation screen after scrolling that is displayed when scroll operation is accepted from a user in a function key display region of operation screen D3.

FIG. 6 is a diagram schematically showing an operation screen after scrolling that is displayed when scroll operation is accepted from a user in the function key display region of operation screen D3.

Referring to FIG. 6, when the speed of the accepted scroll operation is low, image forming apparatus 1 displays an operation screen D21 in which the function keys for advanced functions are scrolled by a short distance, as shown in (a). In operation screen D21, function keys FK21 and FK22 disappear from the screen, and function keys FK23 to FK28 are displayed each at a position moved to the left by the amount of two function keys. Function keys FK29 and FK30 are newly displayed at the positions to the right of function key FK28 where function keys FK27 and FK28 were displayed in operation screen D3.

When the speed of the accepted scroll operation is high, image forming apparatus 1 displays an operation screen D22 in which the function keys for advanced functions are scrolled by a long distance, as shown in (b). In operation screen D22, function keys FK21 to FK26 disappear from the screen, and function keys FK27 and FK28 are displayed each at a position moved to the left by the amount of six function keys. Function keys FK29 to FK34 are newly displayed at the positions to the right of function key FK28 where function keys FK23 to FK28 were displayed in operation screen D3.

Figure 7:
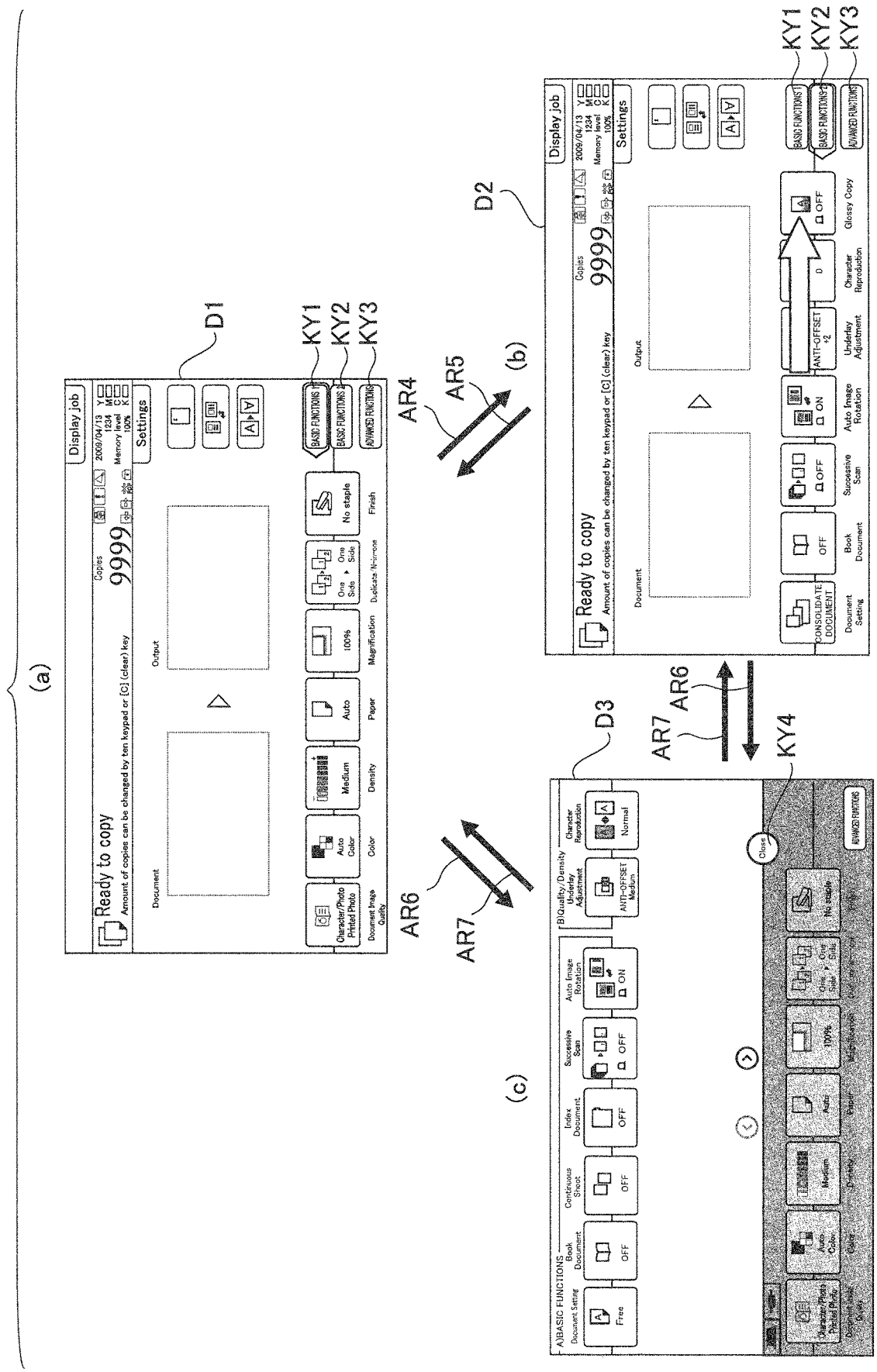
FIG. 7 is a diagram schematically showing switching of operation screens displayed on display 134 of operation panel 130.

FIG. 7 is a diagram schematically showing switching of operation screens displayed on display 134 of operation panel 130.

Referring to FIG. 7, in a state in which operation screen D1 (FIG. 7(a)) including the function keys classified in "basic functions 1" are displayed, when scroll operation (flick operation or swipe operation) from right to left is accepted in the function key display region for basic functions (a menu display area for basic functions) or when screen switch key KY2 is pressed, image forming apparatus 1 switches the operation screen displayed on display 134 to operation screen D2 (FIG. 7(b)) including the function keys classified in "basic functions 2", as shown by arrow AR4.

In a state in which operation screen D2 is displayed, when scroll operation (flick operation or swipe operation) from left to right is accepted in the function key display region for basic functions or when screen switch key KY1 is pressed, image forming apparatus 1 switches the operation screen displayed on display 134 to operation screen D1 including the function keys classified in "basic functions 1", as shown by arrow AR5.

In a state in which operation screen D1 or D2 is displayed, when screen switch key KY3 is pressed, image forming apparatus 1 switches the operation screen displayed on display 134 to operation screen D3 (FIG. 7(c)) including the menu items of advanced functions, as shown by arrow AR6.

In a state in which operation screen D3 is displayed, when screen switch key KY4 is pressed, image forming apparatus 1 switches the operation screen displayed on display 134 to operation screen D1 or D2, as shown by arrow AR7.

Figure 8:
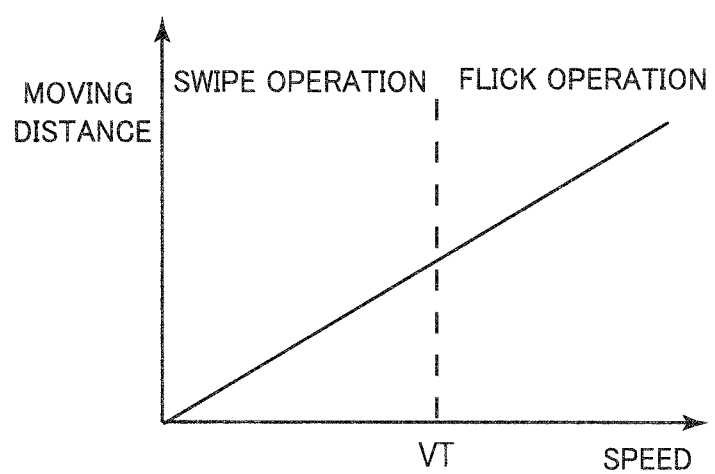
FIG. 8 is a diagram schematically showing a general relation between the speed of scroll operation and the distance over which function keys are scrolled.

FIG. 8 is a diagram schematically showing a general relation between the speed of scroll operation and the distance over which function keys are scrolled.

Referring to FIG. 8, in general, image forming apparatus 1 scrolls the function keys by a longer distance as the speed of the accepted scroll operation is higher. The scroll operation of moving the operating member at a predetermined speed VT or higher is flick operation, and the scroll operation of moving the operating member below a predetermined speed VT is swipe operation. Image forming apparatus 1 may accept only one of flick operation and swipe operation as scroll operation for menu items, or may accept both of flick operation and swipe operation as scroll operation for menu items.

Figure 9:
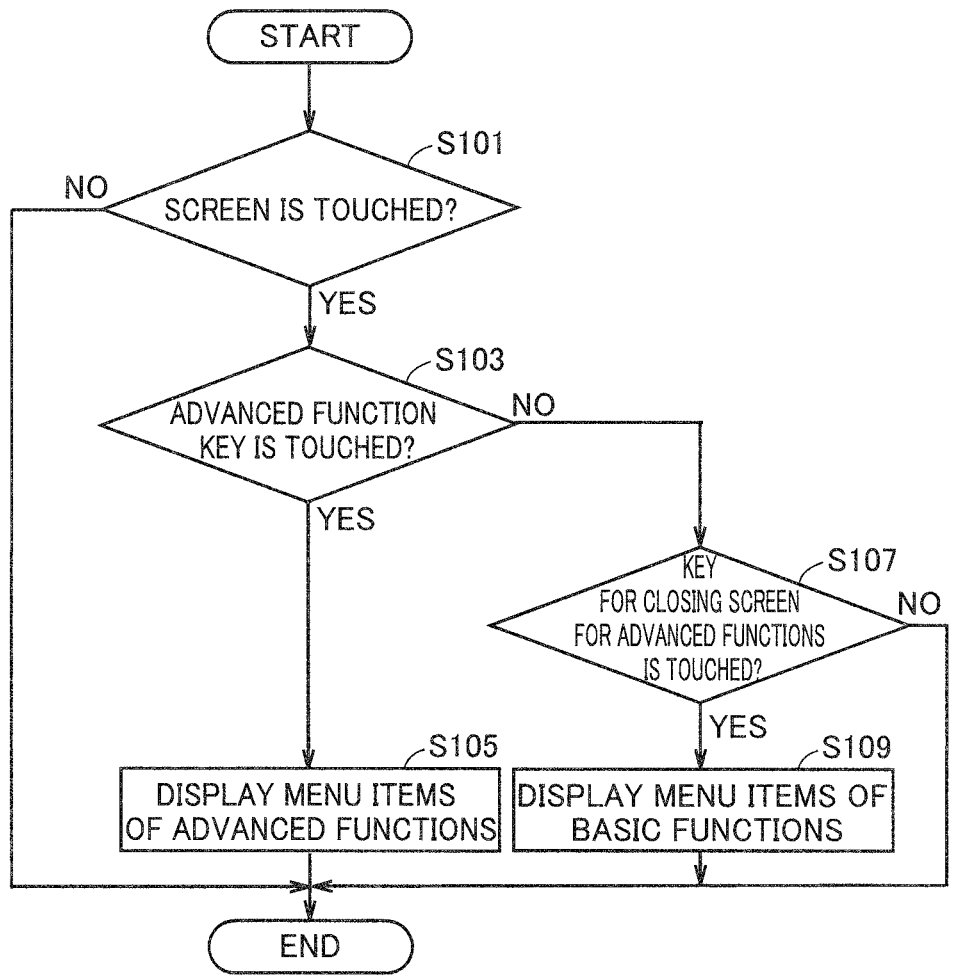
FIG. 9 is a flowchart of a display process for the operation screen for advanced functions.

FIG. 9 is a flowchart of a display process for the operation screen for advanced functions.

Referring to FIG. 9, when image forming apparatus 1 is powered on, CPU 101 determines whether touch panel 135 is touched (S101).

If it is determined that touch panel 135 is touched in step S101 (YES in S101), CPU 101 determines whether an advanced function key (screen switch key KY3) is touched (S103). On the other hand, if it is determined that touch panel 135 is not touched (NO in S101), CPU 101 terminates the process.

If it is determined that an advanced function key is touched in step S103 (YES in S103), CPU 101 displays the menu items of advanced functions (operation screen D3 for advanced functions) on display 134 (S105) and terminates the process.

If it is determined that an advanced function key is not touched in step S103 (NO in S103), CPU 101 determines whether a key for closing the operation screen for advanced functions (screen switch key KY4) is touched (S107).

If it is determined that a close key is touched in step S107 (YES in S107), CPU 101 closes the operation screen for advanced functions and displays the menu items of basic functions (operation screen D1 or D2 for basic functions) (S109). CPU 101 then terminates the process. On the other hand, if it is determined that a close key is not touched in step S107 (NO in S107), CPU 101 terminates the process.

Figure 10:
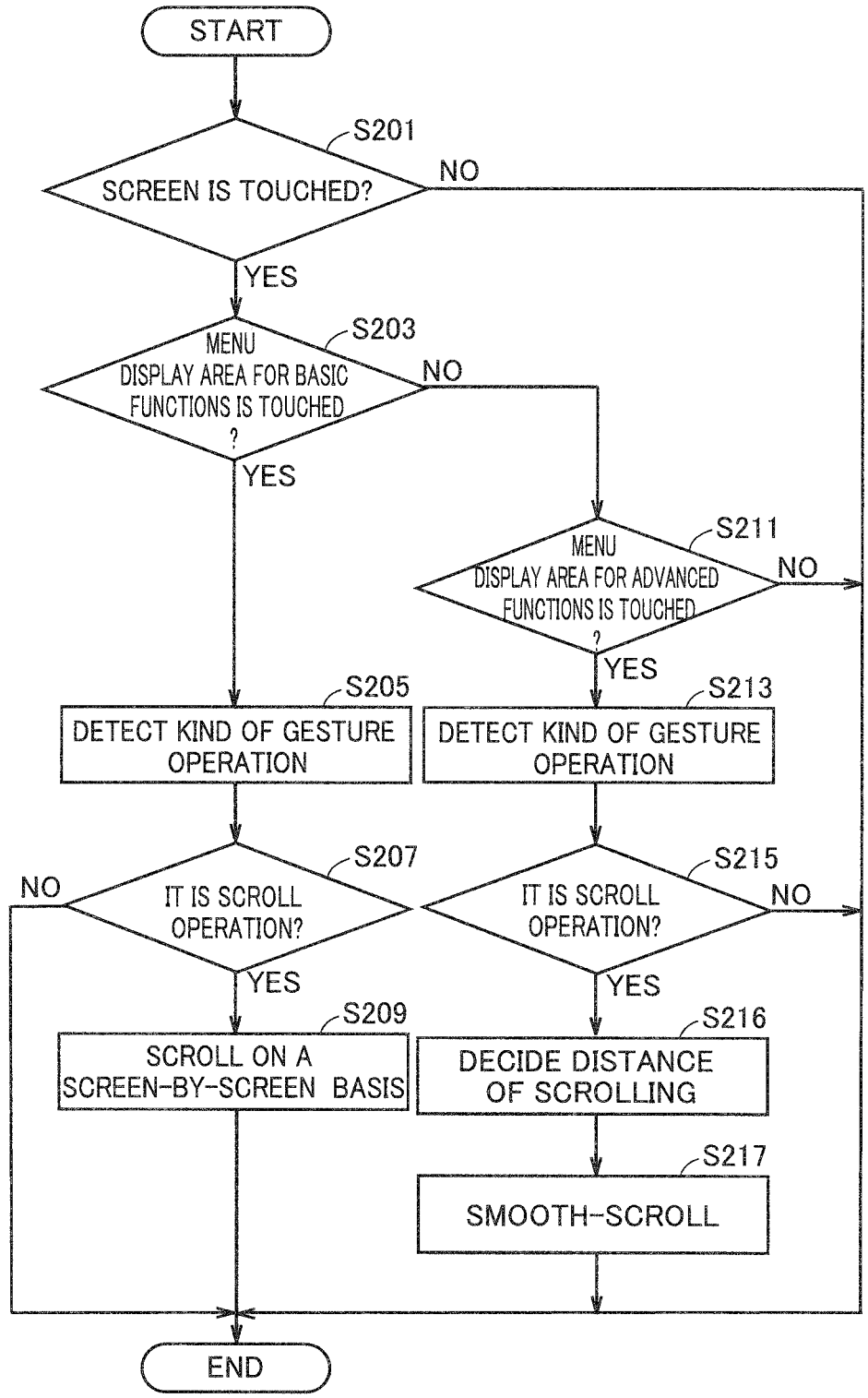
FIG. 10 is a flowchart of a switching process and a scrolling process for operation screens.

FIG. 10 is a flowchart of a switching process and a scrolling process for operation screens.

Referring to FIG. 10, when image forming apparatus 1 is powered on, CPU 101 determines whether touch panel 135 is touched (S201).

If it is determined that touch panel 135 is touched in step S201 (YES in S201), CPU 101 determines whether the menu display area for basic functions (the function key display region for basic functions) is touched (S203).

If it is determined that the menu display area for basic functions is touched in step S203 (YES in S203), CPU 101 detects the kind of gesture operation (specifically, which of touch operation, flick operation, and swipe operation is accepted on touch panel 135) (S205).

Subsequently to the process in step S205, CPU 101 determines whether the kind of gesture operation is scroll operation (flick operation or swipe operation) (S207).

If it is determined that it is scroll operation in step S207 (YES in S207), CPU 101 switches the operation screens for basic functions in such a manner as to scroll on a screen-by-screen basis (S209) and terminates the process. On the other hand, if it is determined that it is not scroll operation in step S207 (NO in S207), CPU 101 terminates the process.

If it is determined that the menu display area for basic functions is not touched in step S203 (NO in S203), CPU 101 determines whether the menu display area for advanced functions (the function key display region for advanced functions) is touched (S211). If it is determined that the menu display area for advanced functions is touched in step S211 (YES in S211), CPU 101 detects the kind of gesture operation (specifically, which of touch operation, flick operation, and swipe operation is accepted on touch panel 135) (S213).

Subsequently to the process in step S213, CPU 101 determines whether the kind of gesture operation is scroll operation (flick operation or swipe operation) (S215).

If it is determined that it is scroll operation in step S215 (YES in S215), CPU 101 decides a distance of scrolling based on the speed of the accepted scroll operation (S216) and smooth-scrolls the operation screen for advanced functions by the decided distance (S217). CPU 101 then terminates the process. On the other hand, if it is determined that it is not scroll operation in step S215 (NO in S215), CPU 101 terminates the process.

[First Modification of Operation Screen Switching Method]

In a first modification, in a case where scroll operation on the menu items of basic functions is accepted in a state in which image forming apparatus 1 displays the operation screen for basic functions, if there is no more function key (item) to be displayed after scrolling, image forming apparatus 1 does not switch the operation screens for basic functions. Similarly, in a case where scroll operation on the menu items of advanced functions is accepted in a state in which image forming apparatus 1 displays the operation screen for advanced functions, if there is no more function key (item) to be displayed after scrolling, image forming apparatus 1 does not scroll the operation screens for advanced functions.

The wording "when scroll operation is accepted, there is no more function key to be displayed after scrolling" means, for example, that scroll operation is accepted in a state in which the number of function keys to be displayed on the operation screen is few so that the function keys fit into a single operation screen, or that scroll operation is accepted in a direction that does not allow scrolling (for example, scroll operation from left to right in operation screen D1 shown in FIG. 3(*a*) or in operation screen D3 shown in FIG. 5).

Figure 11:
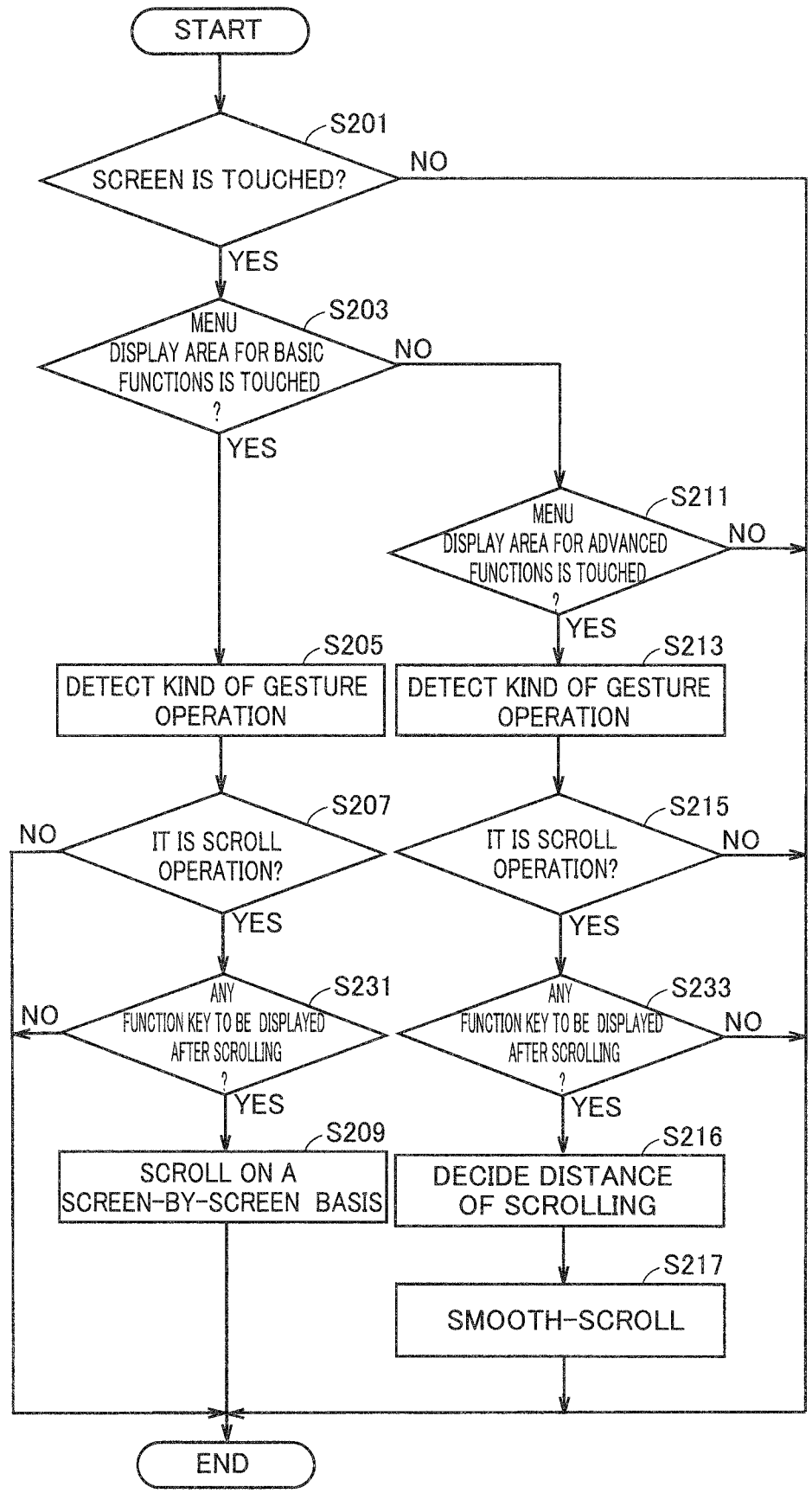
FIG. 11 is a flowchart of a switching process and a scrolling process for operation screens in a first modification.

FIG. 11 is a flowchart of a switching process and a scrolling process for operation screens in the first modification.

Referring to FIG. 11, this flowchart differs from the flowchart in FIG. 10 in that a determination process in step S231 is performed between the process in step S207 and the process in step S209 and in that a determination process in step S233 is performed between the process in step S215 and the process in step S216. The specifics are as follows.

If it is determined that it is scroll operation in step S207 (YES in S207), CPU 101 determines whether there is any function key to be displayed after scrolling (S231).

If it is determined that there is any function key to be displayed in step S231 (YES in S231), CPU 101 switches the operation screens for basic functions in such a manner as to scroll on a screen-by-screen (S209) and terminates the process. On the other hand, if it is determined that there is no more function key to be displayed in step S231 (NO in S231), CPU 101 terminates the process.

If it is determined that it is scroll operation in step S215 (YES in S215), CPU 101 determines whether there is any function key to be displayed after scrolling (S233).

If it is determined that there is any function key to be displayed in step S233 (YES in S233), CPU 101 decides a distance of scrolling based on the speed of the accepted scroll operation (S216) and smooth-scrolls the operation screen for advanced functions by the decided distance (S217). CPU 101 then terminates the process. On the other hand, if it is determined that there is no more function key to be displayed in step S233 (NO in S233), CPU 101 terminates the process.

[Second Modification of Operation Screen Switching Method]

Figure 12:
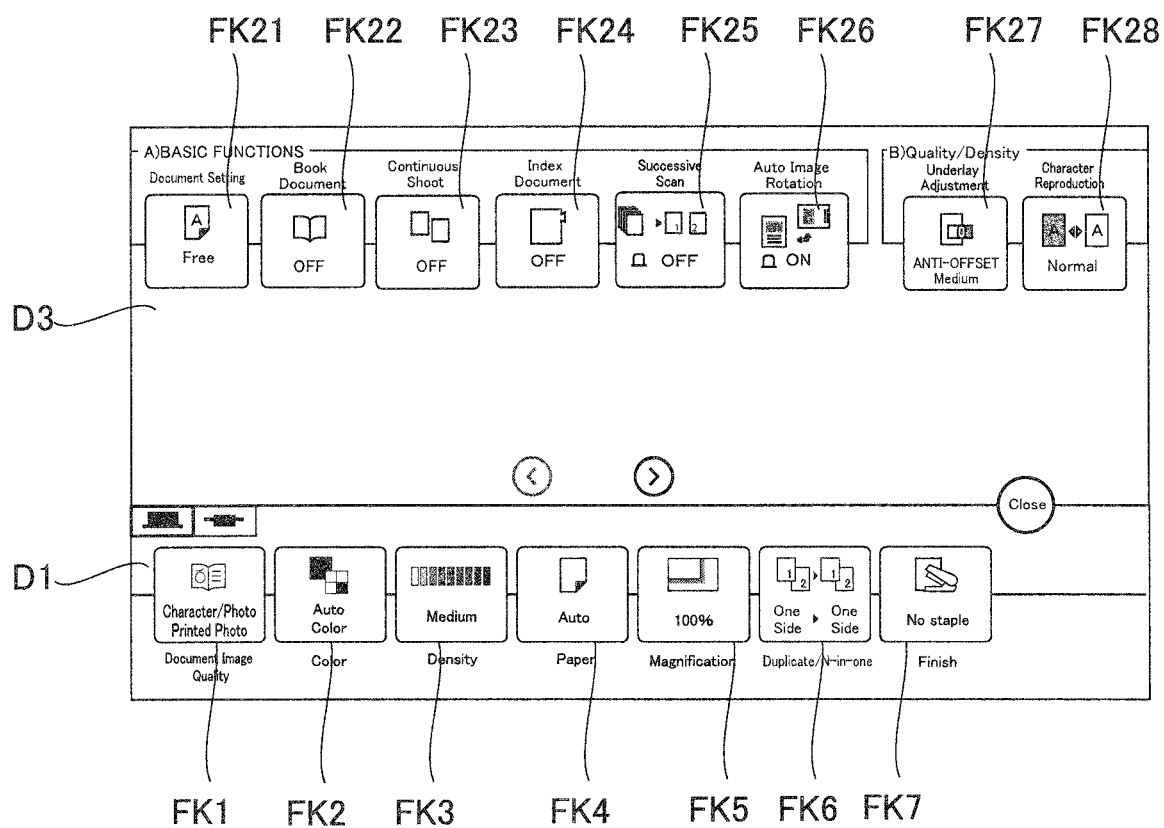
FIG. 12 is a diagram schematically showing an operation screen for advanced functions displayed on display 134 of operation panel 130 in a second modification.

FIG. 12 is a diagram schematically showing an operation screen for advanced functions displayed on display 134 of operation panel 130 in a second modification.

Referring to FIG. 12, in a second modification, when image forming apparatus 1 pops up operation screen D3 for advanced functions onto operation screen D1 for basic functions, image forming apparatus 1 does not gray out function keys FK1 to FK7 included in operation screen D1. In this case, image forming apparatus 1 is accepting from the user both of scroll operation on the function key display region for basic functions (the region where function keys FK1 to FK7 are displayed) and scroll operation on the function key display region for advanced functions (the region where function keys FK21 to FK28 are displayed).

[Method of Editing Function Keys]

Next, a method of editing function keys displayed on each operation screen for basic functions and for advanced functions will now be described. In the present embodiment, the function keys displayed on each operation screen for basic functions and for advanced functions can be selected and set as desired by the user from all the function keys of image forming apparatus 1.

Figure 13:
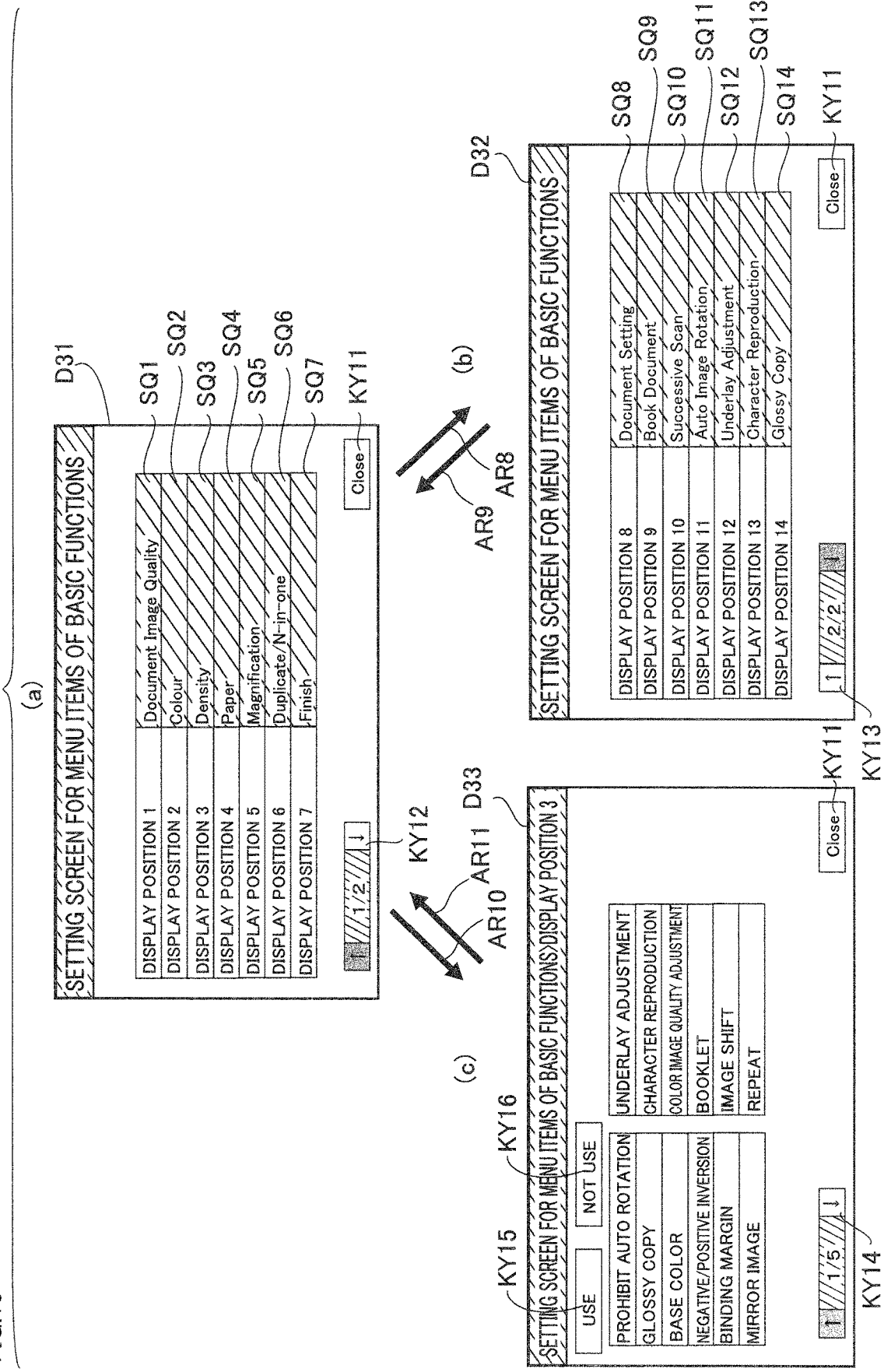
FIG. 13 is a diagram schematically showing a setting screen for menu items of basic functions.

FIG. 13 is a diagram schematically showing a setting screen for menu items of basic functions.

Referring to FIG. 13, when a press on a key (for example, a hardware key or software key of operation panel 130) for accepting editing of the function keys for basic functions is accepted, image forming apparatus 1 displays a setting screen D31 for menu items of basic functions (FIG. 13(a)) on display 134. Setting screen D31 is a screen for accepting a selection of the kinds of function keys displayed at display positions 1 to 7 of function keys for basic functions. Setting screen D31 includes setting fields SQ1 to SQ7 corresponding to display positions 1 to 7. When a press on any one of display fields SQ1 to SQ7 is accepted, image forming apparatus 1 accepts the selection of a function key to be displayed at the display position corresponding to the pressed setting field.

Display positions 1 to 7 correspond to the positions where function keys FK1 to FK7 for basic functions are displayed in operation screen D1 shown in FIG. 3(a). In setting screen D31, the function keys "document image quality", "color", "density", "paper", "magnification", "duplicate/N-in-one", and "finishing" are set at display positions 1 to 7, respectively. In this case, the function keys "document image quality", "color", "density", "paper", "magnification", "duplicate/N-in-one", and "finishing" are displayed at the respective positions where function keys FK1 to FK7 are displayed in operation screen D1 shown in FIG. 3(a).

Setting screen D31 further includes a "CLOSE" key KY11 and a "MOVE" key KY 12. If "CLOSE" key KY11 is pressed, image forming apparatus 1 terminates the display of the setting screen for menu items of basic functions and switches the screen displayed on display 134 to the operation screen for basic functions. If "MOVE" key KY12 is pressed, image forming apparatus 1 moves the screen displayed on display 134 to a setting screen D32 for menu items of basic functions, as shown by arrow AR8 (FIG. 13(b)), a setting screen existing below setting screen D31).

Setting screen D32 is a screen for accepting a selection of the kinds of function keys displayed at display positions 8 to 14 for function keys for basic functions. Setting screen D32 includes setting fields SQ8 to SQ14 corresponding to display positions 8 to 14. When a press on any one of setting fields SQ8 to SQ14 is accepted, image forming apparatus 1 accepts the selection of a function key to be displayed at the display position corresponding to the pressed setting field.

Display positions 8 to 14 correspond to the positions where function keys FK8 to FK14 for basic functions are displayed in operation screen D2 shown in FIG. 3(b). In setting screen D32, the function keys "document setting", "book document", "successive scan", "auto image rotation", "underlay adjustment", "character reproduction", and "glossy copy" are set at display positions 8 to 14, respectively. In this case, in operation screen D2 shown in FIG. 3(b), the function keys "document setting", "book document", "successive scan", "auto image rotation", "underlay adjustment", "character reproduction", and "glossy copy" are displayed at the respective positions where function keys FK8 to FK14 are displayed.

Setting screen D32 further includes a "CLOSE" key KY11 and a "MOVE" key KY13. If "MOVE" key KY13 is pressed, image forming apparatus 1 moves the screen displayed on display 134 to setting screen D31 for menu items of basic functions (a setting screen existing above setting screen D32).

For example, if a press on setting field SQ3 is accepted in setting screen D31, image forming apparatus 1 moves the screen displayed on display 134 to a setting screen D33 (FIG. 13(c)), as shown by arrow AR10.

Setting screen D33 is a setting screen for accepting the selection of a function key to be displayed at display position 3. Setting screen D33 includes candidate keys "prohibit auto rotation", "glossy copy", "base color", "negative/positive inversion", "binding margin", "mirror image", "underlay adjustment", "character reproduction", "color image quality adjustment", "booklet", "image shift", and "repeat", which are candidates for the function key to be displayed at display position 3, a "CLOSE" key KY11, a "MOVE" key KY14, a "USE" key KY15, and a "NOT USE" key KY16.

When a press on any one of the candidate keys is accepted in setting screen D33 and a press on "USE" key KY15 is thereafter accepted, image forming apparatus 1 sets the function of the pressed candidate key as the function key for a basic function to be displayed at display position 3. On the other hand, when a press on "NOT USE" key KY16 is accepted (the selection of a function key to be displayed is not accepted), image forming apparatus 1 does not display a function key at display position 3. In this case, in operation screen D1 shown in FIG. 3(a), the spacing between function key FK2 and function key FK4 becomes wider than the spacing between other function keys.

When "CLOSE" key KY 11 is pressed, when "USE" key KY15 is pressed, or when "NOT USE" key KY16 is pressed, image forming apparatus 1 moves the screen displayed on display 134 to setting screen D31 for menu items of basic functions, as shown by arrow AR11. When "MOVE" key KY14 is pressed, image forming apparatus 1 moves the candidate keys to be displayed to other candidate keys (candidate keys existing below the candidate key included in setting screen D33).

When the configuration or display positions of the function keys for basic functions are changed through setting screen D31 or D32, image forming apparatus 1 stores the changed configuration and display positions of the basic functions into fixed storage device 110.

Figure 14:
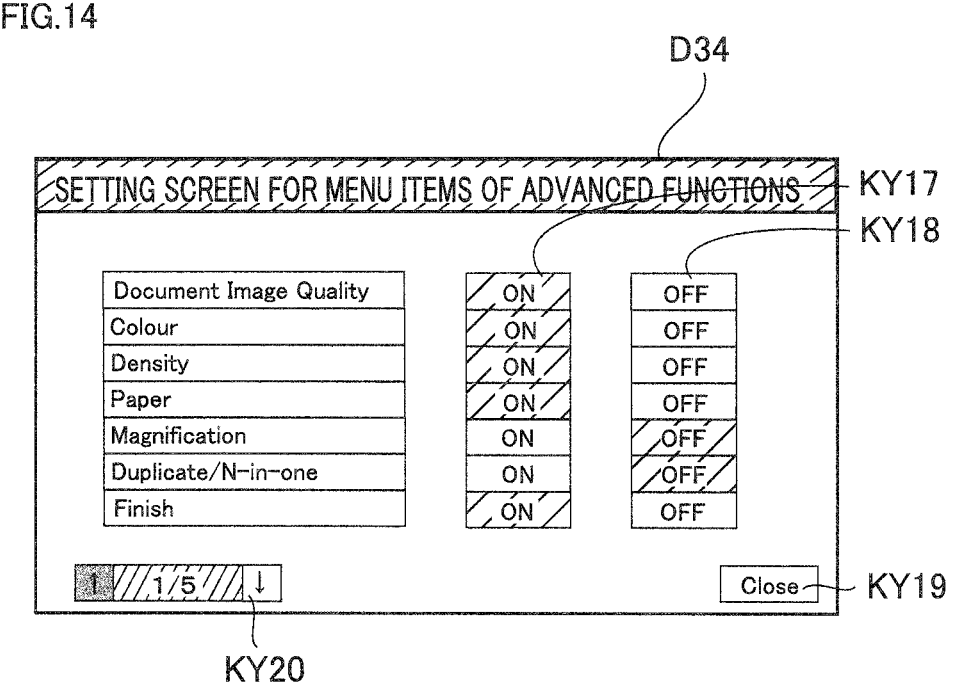
FIG. 14 is a diagram schematically showing a setting screen for menu items of advanced functions.

FIG. 14 is a diagram schematically showing a setting screen for menu items of advanced functions.

Referring to FIG. 14, when a press on a key (for example, a hardware key or software key on operation panel 130) for accepting editing of the function keys for advanced functions is accepted, image forming apparatus 1 displays a setting screen D34 for menu items of advanced functions on display 134. Setting screen D34 is a screen for accepting settings as to whether to display the function keys related to the functions "document image quality", "color", "density", "paper", "magnification", "duplicate/N-in-one", and "finishing", which are candidates for the advanced functions, in the operation screen for advanced functions.

Setting screen D34 includes a "ON" key KY17 and an "OFF" key KY18 provided for each function that is a candidate for advanced functions. When a press on "ON" key KY17 is accepted, image forming apparatus 1 sets the function key for the function corresponding to the pressed "ON" key KY 17, as a function key of the advanced function. On the other hand, when a press on "OFF" key KY18 is accepted, image forming apparatus 1 excludes the function key for the function corresponding to the pressed "OFF" key KY18 from the function keys for advanced functions. In the state shown in FIG. 14, the function keys for the functions "document image quality", "color", "density", "paper", and "finishing" are set as function keys for advanced functions.

Setting screen D34 further includes a "CLOSE" key KY 19 and a "MOVE" key KY20. When "CLOSE" key KY19 is pressed, image forming apparatus 1 terminates the display of the setting screen for menu items of advanced functions and switches the screen displayed on display 134 to the operation screen for basic functions. When "MOVE" key KY20 is pressed, image forming apparatus 1 moves the candidates for advanced functions to be displayed to other candidates (candidates existing below the candidates included in setting screen D34). The user can make settings, for all the functions that can be set in image forming apparatus 1, as to whether to include each into advanced functions, by moving the candidates for advanced functions to be displayed to other candidates.

Referring to FIG. 5 and FIG. 14, the function keys set as advanced functions in setting screen D34 are displayed in operation screen D3. The order in which the functions set as advanced functions are arranged from top to bottom in setting screen D34 is equal to the arrangement order of the function keys from left to right in operation screen D3.

Specifically, in setting screen D34, the functions "document image quality", "color", "density", "paper", and "finishing" are set as advanced functions. In this case, image forming apparatus 1 displays the functions keys for the functions "document image quality", "color", "density", "paper" and "finishing" at the display positions of function keys FK21 to FK25 in operation screen D3. Meanwhile, in setting screen D34, the functions "magnification" and "duplicate/N-in-one" existing between the function "paper" and the function "finishing" are excluded from advanced functions. In this case, image forming apparatus 1 displays the function key "paper" and the function key "finishing" by bringing them closer to each other. As a result, all the function keys for advanced functions are displayed so as to be arranged at regular intervals in operation screen D3.

When the configuration of the function keys for advanced functions is changed through setting screen D34, image forming apparatus 1 stores the changed configuration of advanced functions into fixed storage device 110.

It is noted that the same function may be included into both of the basic functions and the advanced functions. In this case, the function key displayed in the function key display region for basic functions and the function key displayed in the function key display region for advanced functions are related to the same function but are different in a manner of being moved when scroll operation is accepted.

Figure 15:
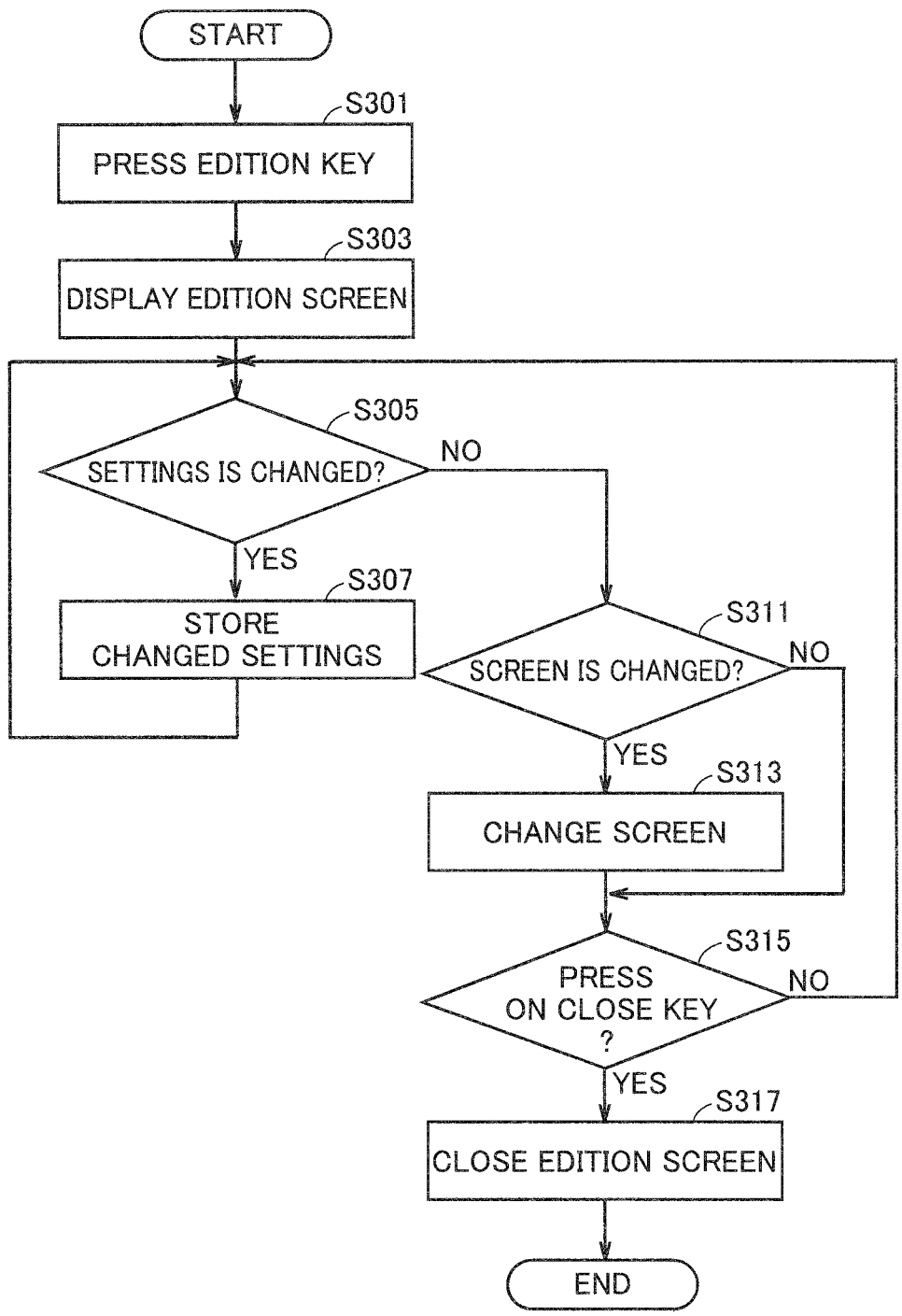
FIG. 15 is a flowchart of a function key editing process.

FIG. 15 is a flowchart of a function key editing process.

Referring to FIG. 15, when a press on a key for accepting edition editing of function keys for basic functions or advanced functions is accepted (S301), CPU 101 displays the setting screen (edition screen) for the functions related to the pressed key on display 134 (S303). CPU 101 then determines whether a change of settings is accepted in the setting screen (S305).

If it is determined that a change of settings is accepted in step S305 (YES in S305), CPU 101 stores the changed settings into fixed storage device 110 (S307) and proceeds to the process in step S305.

If it is determined that a change of settings is not accepted in step S305 (NO in S305), CPU 101 determines whether operation of changing the screens (for example, a press on "MOVE" key KY12 to KY14 or KY20) is accepted (S311).

If it is determined that operation of changing the screens is accepted in step S311 (YES in S311), CPU 101 changes the screens in accordance with the operation (S313) and proceeds to the process in step S315. On the other hand, if it is determined that operation of changing the screens is not accepted in step S311 (NO in S311), CPU 101 proceeds to the process in step S315.

In step S315, CPU 101 determines whether a press on the CLOSE key is accepted (S315).

If it is determined that a press on the CLOSE key is accepted in step S315 (YES in S315), CPU 101 closes the setting screen (S317) and terminates the process. On the other hand, if it is determined that a press on the CLOSE key is not accepted in step S315 (NO in S315), CPU 101 proceeds to the process in step S305.

Effects of Embodiments

The foregoing embodiments can provide a display apparatus with improved operability.

According to the foregoing embodiments, the function keys for basic functions are displayed so as to be stopped at a predetermined stop position, so that the user can quickly make settings of basic functions by remembering the display positions of the function keys for basic functions, thereby ensuring the convenience in setting the basic functions. In addition, the function keys for basic functions displayed on the operation screen can be switched by scroll operation, so that the function keys for basic functions can be switched by the same operation as the operation of switching the function keys for advanced functions. As a result, the operability can be improved.

[Others]

In the foregoing embodiments, the arrangement direction of function keys for basic functions and the arrangement direction of function keys for advanced functions in the operation screen are both horizontal. However, the arrangement direction of function keys for basic functions and the arrangement direction of function keys for advanced functions are set as desired, either in the same direction or in different directions.

In the forgoing embodiments, screen switch keys KY1 and KY2 may not be displayed in operation screens D1 and D2, and the display of the function keys for basic functions may be switched only by scroll operation.

If a press on print key 132 is accepted in a state in which the settings of functions related to image formation are accepted through operation panel 130, image forming apparatus 1 forms an image on paper with image output device 140 based on the accepted settings related to image formation. Image forming apparatus 1 may thereafter initialize the settings of all the functions by deleting the settings of the functions accepted so far, or may retain the settings accepted so far.

Editing of only the function keys that configure one of the menu items of basic functions and the menu items of advanced functions may be accepted from the user, and edition of the function keys that configure the other menu items may be prohibited. Edition of the function keys that configure both of the menu items of basic functions and the menu items of advanced functions may be prohibited.

The foregoing embodiments can be combined as appropriate.

The process in the foregoing embodiments may be performed by software or using a hardware circuit. A program for executing the process in the foregoing embodiments may be provided. A recording medium, such as a CD-ROM, a flexible-disk, a hard disk, a ROM, a RAM, or a memory card, encoded with the program may be provided to users. The program is executed by a computer such as a CPU. The program may be downloaded to the apparatus through a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display apparatus for an image forming apparatus, the display apparatus comprising:
   an operation panel that includes a display that displays information about the image forming apparatus and that accepts operations of the image forming apparatus;
   an operation accepting unit for accepting a flick operation on the display; and
   a hardware processor configured to control display contents displayed on the display; wherein
   the hardware processor is configured to display a first display screen on the display, in which keys of a first portion of a first menu item are displayed at predetermined display positions as a first menu, the keys of the first menu item accept settings related to the image forming apparatus, and the first menu item includes more keys than can be displayed on the first display screen at one time,
   when a first flick operation is accepted as a scroll operation on the first menu, the hardware processor is configured to switch the displayed keys of the first portion to a plurality of keys of a second portion of the first menu item in a stationary state at the predetermined display positions on the first display screen, irrespective of a speed of the first flick operation, wherein all of the keys of the first portion are different from the keys of the second portion of the first menu item, wherein the first flick operation is a horizontal flick operation,
   the hardware processor is also configured to display a second display screen on the display when an operation is performed on the first display screen,
   the second display screen is a screen on which at least some keys of a second menu item are arranged in a predetermined direction and are displayed as a second menu, the second menu item being different from the first menu item, and the second menu item is composed of a plurality of keys that accept settings related to the image forming apparatus,
   when a second flick operation as a scroll operation on the second menu is accepted, the hardware processor moves and displays the keys of the second menu item based on a distance corresponding to a speed of the accepted second flick operation,
   further comprising a switching button displayed on the first screen for switching between the keys of the first portion and the keys of the second portion of the first menu item, wherein the switching button is not displayed on the second screen.

2. The display apparatus according to claim 1, wherein the hardware processor switches a form of scrolling a key in accordance with the second flick operation based on a screen on which the second flick operation is accepted between a form of scrolling in screen units and a form of scrolling based on the distance corresponding to the speed of the second flick operation accepted.

3. The display apparatus according to claim 1, further comprising a selection unit for accepting a selection to activate which of a screen in which a key of the first menu item is displayed or a screen in which a key of the second menu item is displayed, wherein
   if the selection to activate the screen in which the keys of the second menu item are displayed is accepted, the acceptance of the first flick operation on the screen in which the keys of the first menu item is displayed is stopped and the acceptance of the second flick operation on the screen in which the keys of the second menu item is displayed is started.

4. The display apparatus according to claim 3, wherein if the selection to activate the screen in which the keys of the second menu item is displayed is accepted, the second display screen is popped up.

5. The display apparatus according to claim 1, wherein each of keys of the first menu item is aligned and displayed along a predetermined direction, the hardware processor displays a displayed key by moving the displayed key along the predetermined direction when the first and second portions are displayed by switching.

6. The display apparatus according to claim 1, wherein the first and second portions are displayed by switching irrespective of scrolling quantities corresponding to the first flick operation accepted by the operation accepting unit.

7. The display apparatus according to claim 1, wherein the hardware processor accepts a selection of keys configuring at least one of the first and second menu items.

8. The display apparatus according to claim 1, wherein the hardware processor accepts a setting of a display position about each of keys of the first menu item.

9. The display apparatus according to claim 8, wherein the hardware processor accepts a setting of the display position by making a predetermined display position on the display correspond to one of the first menu item, and if the predetermined display position does not correspond to any keys of the first menu item, the hardware processor does not display any keys at the predetermined display position.

10. The display apparatus according to claim 1, wherein
    the hardware processor accepts a setting as to whether to include the keys into the second menu item, and
    the second display screen is displayed so that a plurality of keys which a setting to include into the second menu item is accepted are arranged at regular intervals.

11. The display apparatus according to claim 1, wherein if all the keys included in the first menu item can be displayed at a time, the displayed keys are not switched, even if the first flick operation is accepted.

12. The display apparatus according to claim 1, wherein if all the keys included in the second menu item can be displayed at a time, the displayed keys are not scrolled, even if the second flick operation is accepted.

13. The display apparatus according to claim 1, wherein if a third flick operation on the second portion in an opposite direction to the first flick operation is accepted, after displaying the second portion as a result of acceptance of the first flick operation on the first portion, the hardware processor displays the first portion.

14. The display apparatus according to claim 1, wherein the display apparatus is an image forming apparatus comprising an outputting unit for forming an image on a sheet.

15. The display apparatus according to claim 14, wherein the keys included in the first and second menu items are for setting an image forming condition for forming an image on the sheet by the outputting unit.

16. The display apparatus according to claim 14, wherein the display is provided at an operation panel of the image forming apparatus, the operation panel including a key for an execution instruction of a job of forming an image on the sheet.

17. The display apparatus according to claim 14, wherein the image forming apparatus further comprises an image scanner for scanning a document image.

18. The display apparatus according to claim 1, wherein the second menu item is not displayed until a user performs a touch operation on a press screen key to display the second display screen.

19. The display apparatus according to claim 1, wherein a transition from the first portion of the first menu item to the second portion of the menu item is illustrated by a display that shows a mixture of some keys in the first portion and some keys in the second portion.

20. The display apparatus according to claim 1, wherein the first menu item includes a setting key for finishing and a setting key for page aggregation.

21. The display apparatus according to claim 1, wherein included in the keys that accept settings is a key for accepting setting conditions of a job for forming an image on a sheet.

22. The display apparatus according to claim 1, wherein the first screen includes an area for displaying the number of copies in addition to the first menu item, and the display area for the number of copies is obscured when the second screen is displayed.

23. A display apparatus for an image forming apparatus, the display apparatus comprising:
   a display;
   an operation accepting unit for accepting a swipe operation on the display; and
   a hardware processor configured to control display contents displayed on the display; wherein
   the hardware processor is configured to display a first display screen on the display, in which keys of a first portion of a first menu item are displayed at predetermined display positions as a first menu, the keys of the first menu item accept settings related to the image forming apparatus, and the first menu item includes more keys than can be displayed on the first display screen at one time,
   when a first swipe operation is accepted on the first menu, the hardware processor is configured to switch the displayed keys of the first portion to a plurality of keys of a second portion of the first menu item in a stationary state at the predetermined display positions on the first display screen, irrespective of a speed of the first swipe operation, wherein all of the keys of the first portion are different from the keys of the second portion of the first menu item, wherein the first swipe operation is a horizontal swipe operation, the hardware processor is also configured to display a second display screen when an operation is performed on the first display screen,
   the second display screen is a screen on which at least some keys of a second menu item are arranged in a predetermined direction and are displayed as a second menu, the second menu item being different than the first menu item, and the second menu item is composed of a plurality of keys that accept settings related to the image processing apparatus,
   when a second swipe operation on the second menu is accepted, the hardware processor moves and displays the keys of the second menu item based on a distance corresponding to a speed of the second swipe operation accepted,
   further comprising a switching button displayed on the first screen for switching between the keys of the first portion and the keys of the second portion of the first menu item, wherein the switching button is not displayed on the second screen.

24. The display apparatus according to claim 23, wherein the hardware processor switches a form of scrolling a key in accordance with the second swipe operation based on a screen on which the second swipe operation is accepted between a form of scrolling in screen units and a form of scrolling based on the distance corresponding to the speed of the second swipe operation accepted.

25. The display apparatus according to claim 23, wherein each of keys of the first menu item is aligned and displayed along a predetermined direction, the hardware processor displays a displayed key by moving the displayed key along the predetermined direction when the first and second portions are displayed by switching.

26. The display apparatus according to claim 23, wherein the first and second portions are displayed by switching irrespective of scrolling quantities corresponding to the first swipe operation accepted by the operation accepting unit.

27. The display apparatus according to claim 23, wherein the display apparatus is an image forming apparatus comprising an outputting unit for forming an image on a sheet.

28. The display apparatus according to claim 27, wherein the keys included in the first and second menu items are for setting an image forming condition for forming an image on the sheet by the outputting unit.

29. The display apparatus according to claim 27, wherein the display is provided at an operation panel of the image forming apparatus, the operation panel including a key for an execution instruction of a job of forming an image on the sheet.

30. The display apparatus according to claim 27, wherein the image forming apparatus further comprises an image scanner for scanning a document image.

31. The display apparatus according to claim 23, wherein the second menu item is not displayed until a user performs a touch operation on a press screen key to display the second display screen.

32. The display apparatus according to claim 23, wherein a transition from the first portion of the first menu item to the second portion of the menu item is illustrated by a display that shows a mixture of some keys in the first portion and some keys in the second portion.

33. The display apparatus according to claim 23, wherein the first menu item includes a setting key for finishing and a setting key for page aggregation.

34. The display apparatus according to claim 23, wherein included in the keys that accept settings is a key for accepting setting conditions of a job for forming an image on a sheet.

35. The display apparatus according to claim 23, wherein the first screen includes an area for displaying the number of copies in addition to the first menu item, and the display area for the number of copies is obscured when the second screen is displayed.

36. A non-transitory computer-readable recording medium encoded with a control program for a display apparatus including a display, the control program causing a computer to execute:
accepting a flick operation on the display, and
controlling display contents displayed on the display based on the accepting of the flick operation, wherein
the control program is configured to display a first display screen on the display, in which keys of a first portion of a first menu item are displayed at predetermined display positions as a first menu, the keys of the first menu item accept settings related to the image forming apparatus, and the first menu item includes more keys than can be displayed on the first display screen at one time,
when a first flick operation is accepted as a scroll operation on the first menu, the control program causes the computer to switch the displayed keys of the first portion to a plurality of keys of a second portion of the first menu item in a stationary state at the predetermined display positions on the first display screen, irrespective of a speed of the first flick operation, wherein all of the keys of the first portion are different from the keys of the second portion of the first menu item, wherein the first flick operation is a horizontal flick operation,
the control program also displays a second screen on the display when an operation is performed on the first display screen,
the second display screen is a screen on which at least some keys of a second menu item are arranged in a predetermined direction and are displayed as a second menu, the second menu item being different from the first menu item, and the second menu item is composed of a plurality of keys that accept settings related to the image forming apparatus,
when a second flick operation as a scroll operation on the second menu item is accepted, the control program causes the computer to move and display the keys of the second menu item based on a distance corresponding to a speed of the second flick operation accepted,
further comprising a switching button displayed on the first screen for switching between the keys of the first portion and the keys of the second portion of the first menu item, wherein the switching button is not displayed on the second screen.

37. The non-transitory computer-readable recording medium according to claim 36, wherein the control program causes the computer to switch a form of scrolling a key in accordance with the second flick operation based on a screen on which the second flick operation is accepted between a form of scrolling in screen units and a form of scrolling based on the distance corresponding to the speed of the second flick operation accepted.

38. The non-transitory computer-readable recording medium according to claim 36, wherein the control program causes the computer to execute:
accepting a selection to activate which of a screen in which a key of the first menu item is displayed or a screen in which a key of the second menu item is displayed, wherein
if the selection to activate the screen in which the keys of the second menu item are displayed is accepted, the acceptance of the first flick operation on the screen in which the keys of the first menu item is displayed is stopped and the acceptance of the second flick operation on the screen in which the keys of the second menu item is displayed is started.

39. The non-transitory computer-readable recording medium according to claim 38, wherein if the selection to activate the screen in which the keys of the second menu item is displayed is accepted, the second display screen is popped up.

40. The non-transitory computer-readable recording medium according to claim 36, wherein each of keys of the first menu item is aligned and displayed along a predetermined direction, the control program causes to the computer to display a displayed key by moving the displayed key along the predetermined direction when the first and second portions are displayed by switching.

41. The non-transitory computer-readable recording medium according to claim 36, wherein the first and second portions are displayed by switching irrespective of scrolling quantities corresponding to the first flick operation accepted.

42. The non-transitory computer-readable recording medium according to claim 36, wherein the control program causes the computer to execute:
accepting a selection of keys configuring at least one of the first and second menu items.

43. The non-transitory computer-readable recording medium according to claim 36, wherein the control program causes the computer to execute:
accepting a setting of a display position about each of keys of the first menu item.

44. The non-transitory computer-readable recording medium according to claim 43, wherein the control program causes the computer to execute:
accepting a setting of the display position by making a predetermined display position on the display correspond to one of the first menu item, and if the predetermined display position does not correspond to any keys of the first menu item, the control program does not cause the computer to display any keys at the predetermined display position.

45. The non-transitory computer-readable recording medium according to claim 36, wherein the control program causes the computer to execute:
accepting a setting as to whether to include the keys into the second menu item, and
the second screen is displayed so that a plurality of keys which a setting to include into the second menu item is accepted are arranged at regular intervals.

46. The non-transitory computer-readable recording medium according to claim 36, wherein if all the keys included in the first menu item can be displayed at a time, the displayed keys are not switched, even if the first flick operation is accepted.

47. The non-transitory computer-readable recording medium according to claim 36, wherein if all the keys included in the second menu item can be displayed at a time, the displayed keys are not scrolled, even if the first flick operation is accepted.

48. The non-transitory computer-readable recording medium according to claim 36, wherein if a third flick operation on the second portion in an opposite direction to the first flick operation is accepted, after displaying the second portion as a result of acceptance of the first flick operation on the first screen, the first portion is displayed.

49. The non-transitory computer-readable recording medium according to claim 36, wherein the display apparatus is an image forming apparatus comprising an outputting unit for forming an image on a sheet.

50. The non-transitory computer-readable recording medium according to claim 49, wherein the keys included in the first and second menu items are for setting an image forming condition for forming an image on the sheet by the outputting unit.

51. The non-transitory computer-readable recording medium according to claim 49, wherein the display is provided at an operation panel of the image forming apparatus, the operation panel including a key for an execution instruction of a job of forming an image on the sheet.

52. The non-transitory computer-readable recording medium according to claim 49, wherein the image forming apparatus further comprises an image scanner for scanning a document image.

53. The non-transitory computer-readable recording medium according to claim 36, wherein the second menu item is not displayed until a user performs a touch operation on a press screen key to display the second display screen.

54. A non-transitory computer-readable recording medium encoded with a control program fora display apparatus including a display, the control program causing a computer to execute:
accepting a swipe operation on the display, and
controlling display contents displayed on the display based on the accepting of the swipe operation, wherein
the control program is configured to display a first display screen on the display, in which keys of a first portion of a first menu item are displayed at predetermined display positions as a first menu, the keys of the first menu item accept settings related to the image forming apparatus, and the first menu item includes more keys than can be displayed on the first display screen at one time,
when a first swipe operation is accepted on the first menu, the control program is configured to switch the displayed keys of the first portion to a plurality of keys of a second portion of the first menu item in a stationary state at the predetermined display positions on the first display screen, irrespective of a speed of the first swipe operation, wherein all of the keys of the first portion are different from the keys of the second portion of the first menu item, wherein the first swipe operation is a horizontal swipe operation,
the control program is also configured to display a second display screen on the display when an operation is performed on the first display screen,
the second display screen is a screen on which at least some keys of a second menu item are arranged in a predetermined direction and are displayed as a second menu, the second menu item being different from the first menu item, and the second menu item is composed of a plurality of keys that accept settings related to the image forming apparatus,
when a second swipe operation is accepted on the second menu, the control program causes the computer to move and display the keys of the second menu item based on a distance corresponding to a speed of the second swipe operation accepted,
wherein a switching button is displayed on the first screen for switching between the keys of the first portion and the keys of the second portion of the first menu item, wherein the switching button is not displayed on the second screen.

55. The non-transitory computer-readable recording medium according to claim 54, wherein the control program causes the computer to switch a form of scrolling a key in accordance with the swipe operation based on a screen on which the swipe operation is accepted between a form of scrolling in screen units and a form of scrolling based on the distance corresponding to the speed of the swipe operation accepted.

56. The non-transitory computer-readable recording medium according to claim 54, wherein each of keys of the first menu item is aligned and displayed along a predetermined direction, the control program causes to the computer to display a displayed key by moving the displayed key along the predetermined direction when the first and second portions are displayed by switching.

57. The non-transitory computer-readable recording medium according to claim 54, wherein the first and second portions are displayed by switching irrespective of scrolling quantities corresponding to the swipe operation accepted.

58. The non-transitory computer-readable recording medium according to claim 54, wherein the display apparatus is an image forming apparatus comprising an outputting unit for forming an image on a sheet.

59. The non-transitory computer-readable recording medium according to claim 58, wherein the keys included in the first and second menu items are for setting an image forming condition for forming an image on the sheet by the outputting unit.

60. The non-transitory computer-readable recording medium according to claim 58, wherein the display is provided at an operation panel of the image forming apparatus, the operation panel including a key for an execution instruction of a job of forming an image on the sheet.

61. The non-transitory computer-readable recording medium according to claim 58, wherein the image forming apparatus further comprises an image scanner for scanning a document image.

62. The non-transitory computer-readable recording medium according to claim 54, wherein the second menu item is not displayed until a user performs a touch operation on a press screen key to display the second display screen.

* * * * *